(12) United States Patent
Prugue

(10) Patent No.: US 9,920,876 B2
(45) Date of Patent: Mar. 20, 2018

(54) ACCESSORY MOUNT

(71) Applicant: Bell Sports, Inc., Scotts Valley, CA (US)

(72) Inventor: Ximena Prugue, Santa Cruz, CA (US)

(73) Assignee: Bell Sports, Inc., Scotts Valley, CA (US)

( * ) Notice: Subject to any disclaimer, the term of this patent is extended or adjusted under 35 U.S.C. 154(b) by 0 days.

(21) Appl. No.: 15/261,206

(22) Filed: Sep. 9, 2016

(65) Prior Publication Data

US 2017/0067597 A1 Mar. 9, 2017

Related U.S. Application Data

(60) Provisional application No. 62/216,276, filed on Sep. 9, 2015.

(51) Int. Cl.
| | |
|---|---|
| *F16M 13/00* | (2006.01) |
| *F16M 13/02* | (2006.01) |
| *H04M 1/04* | (2006.01) |
| *G03B 17/56* | (2006.01) |
| *F21V 21/08* | (2006.01) |
| *A42B 3/04* | (2006.01) |
| *F16M 11/10* | (2006.01) |
| *F16M 11/20* | (2006.01) |
| *B62J 11/00* | (2006.01) |

(52) U.S. Cl.
CPC ............. *F16M 13/022* (2013.01); *A42B 3/04* (2013.01); *F16M 11/10* (2013.01); *F16M 11/2014* (2013.01); *F16M 13/00* (2013.01); *F21V 21/0816* (2013.01); *G03B 17/561* (2013.01); *H04M 1/04* (2013.01); *B62J 11/00* (2013.01); *B62J 2300/004* (2013.01); *F16M 2200/024* (2013.01)

(58) Field of Classification Search
USPC ....... 248/917, 919, 921, 922, 346.01, 292.1, 248/292.12
See application file for complete search history.

(56) References Cited

U.S. PATENT DOCUMENTS

| | | | | |
|---|---|---|---|---|
| 5,738,322 A | * | 4/1998 | Huang | ............... B60N 3/10 224/553 |
| 6,009,561 A | | 1/2000 | Bullock et al. | |
| 6,527,240 B1 | * | 3/2003 | Huang | ............... A47G 23/0225 248/218.4 |
| 6,609,272 B1 | * | 8/2003 | Lee | ............... E05D 11/082 16/307 |
| 6,669,155 B2 | * | 12/2003 | Ron | ............... B60R 11/0241 248/176.1 |
| 7,441,734 B2 | * | 10/2008 | Liou | ............... B60R 11/02 248/205.5 |

(Continued)

*Primary Examiner* — Steven Marsh
(74) *Attorney, Agent, or Firm* — Booth Udall Fuller, PLC

(57) ABSTRACT

An accessory mount is disclosed and may include a base, a foot, an accessory receiver, and at least two elastic bindings. The accessory receiver may rotatably couple an accessory to the base, and may include an accessory adapter and a base connector. The base may include a plurality of attachment points distributed at different locations around the base. The foot may include a non-slip surface on a first side, and a plurality of projections on a second side that mate with a corresponding plurality of recesses in a bottom surface of the base.

20 Claims, 20 Drawing Sheets

(56) References Cited

U.S. PATENT DOCUMENTS

| | | | |
|---|---|---|---|
| 8,109,479 B1 * | 2/2012 | Tsai | F16B 47/00 248/205.5 |
| 8,640,998 B2 * | 2/2014 | Lau | F16M 11/041 248/121 |
| 2014/0189937 A1 | 7/2014 | Pietrzak et al. | |

* cited by examiner

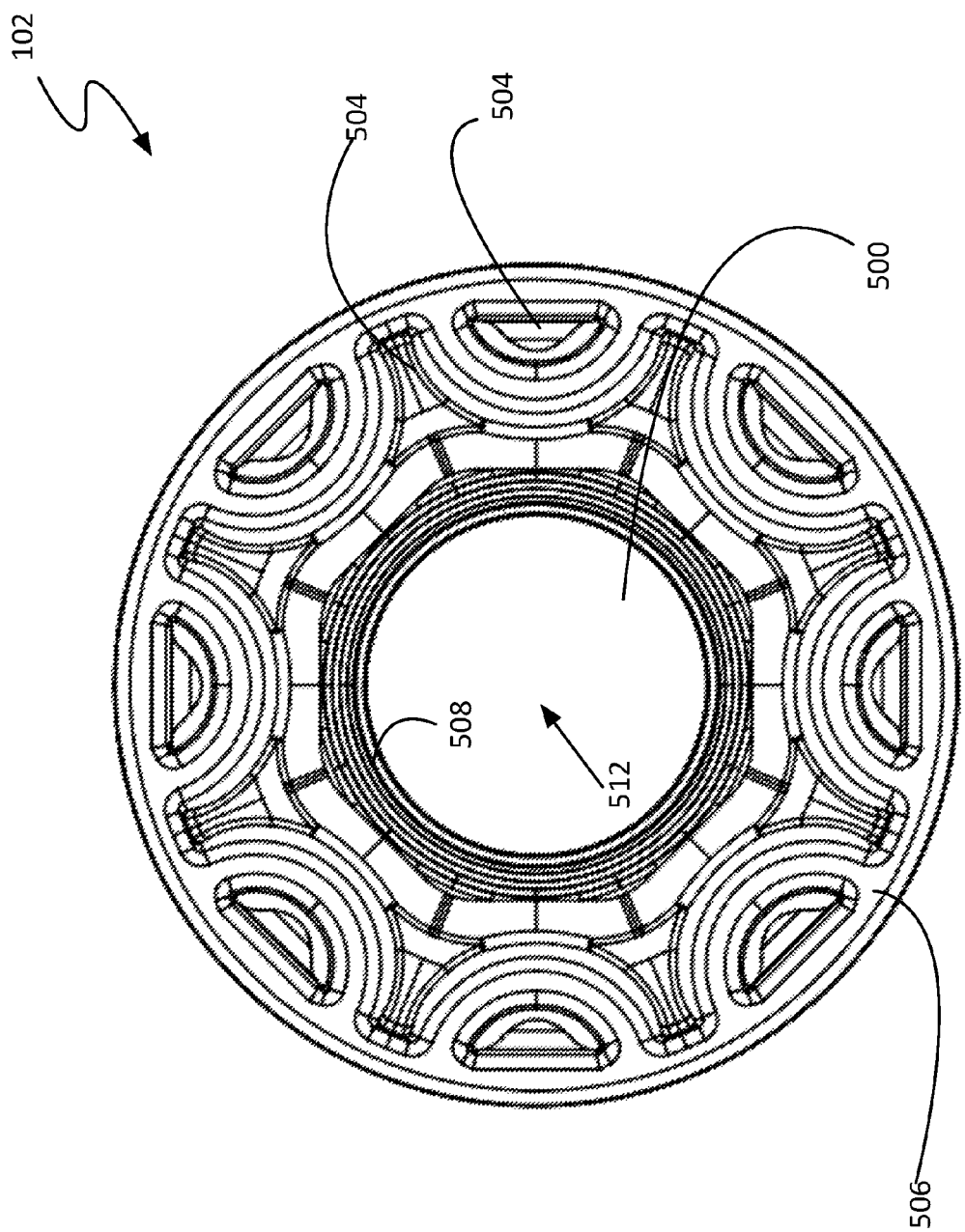

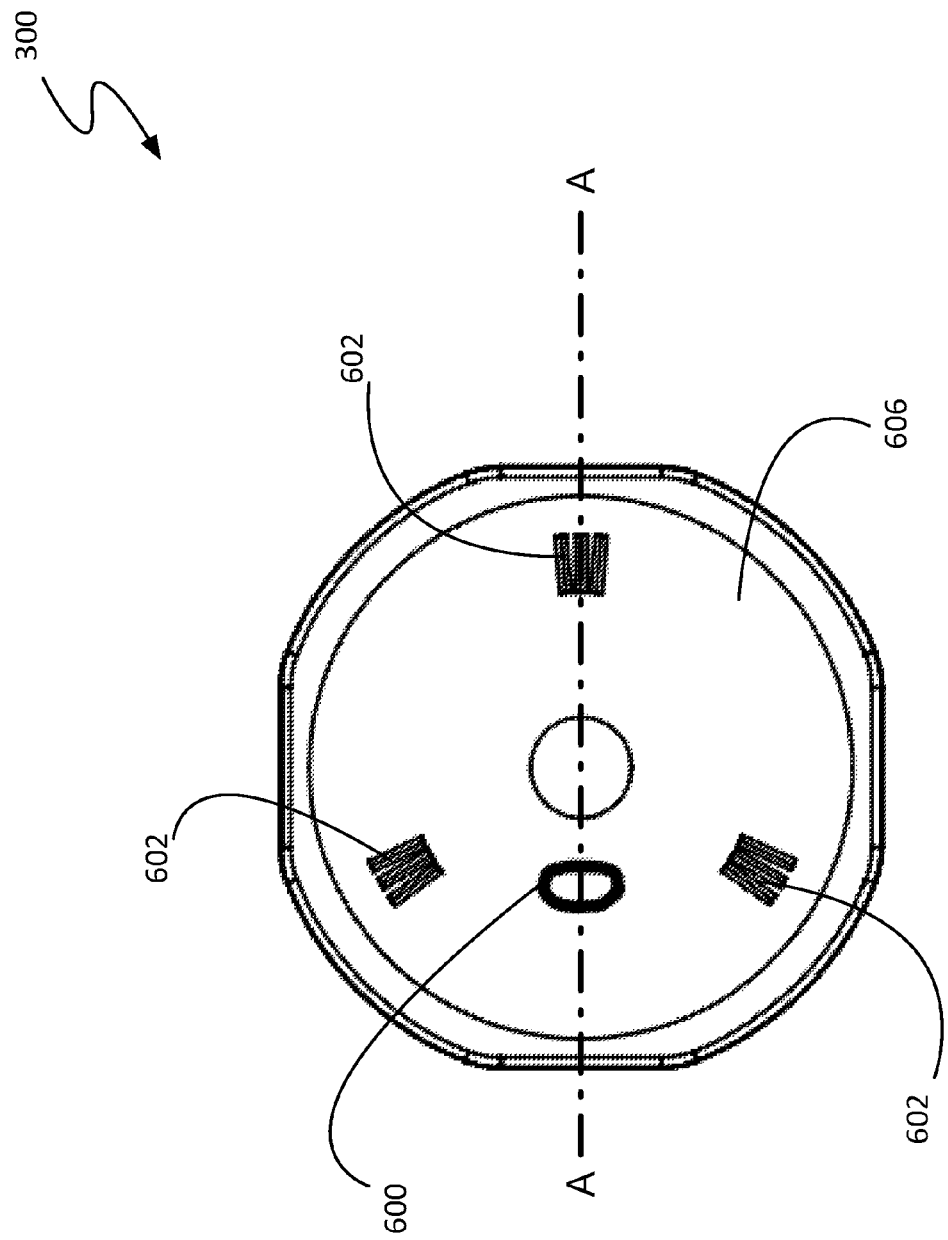

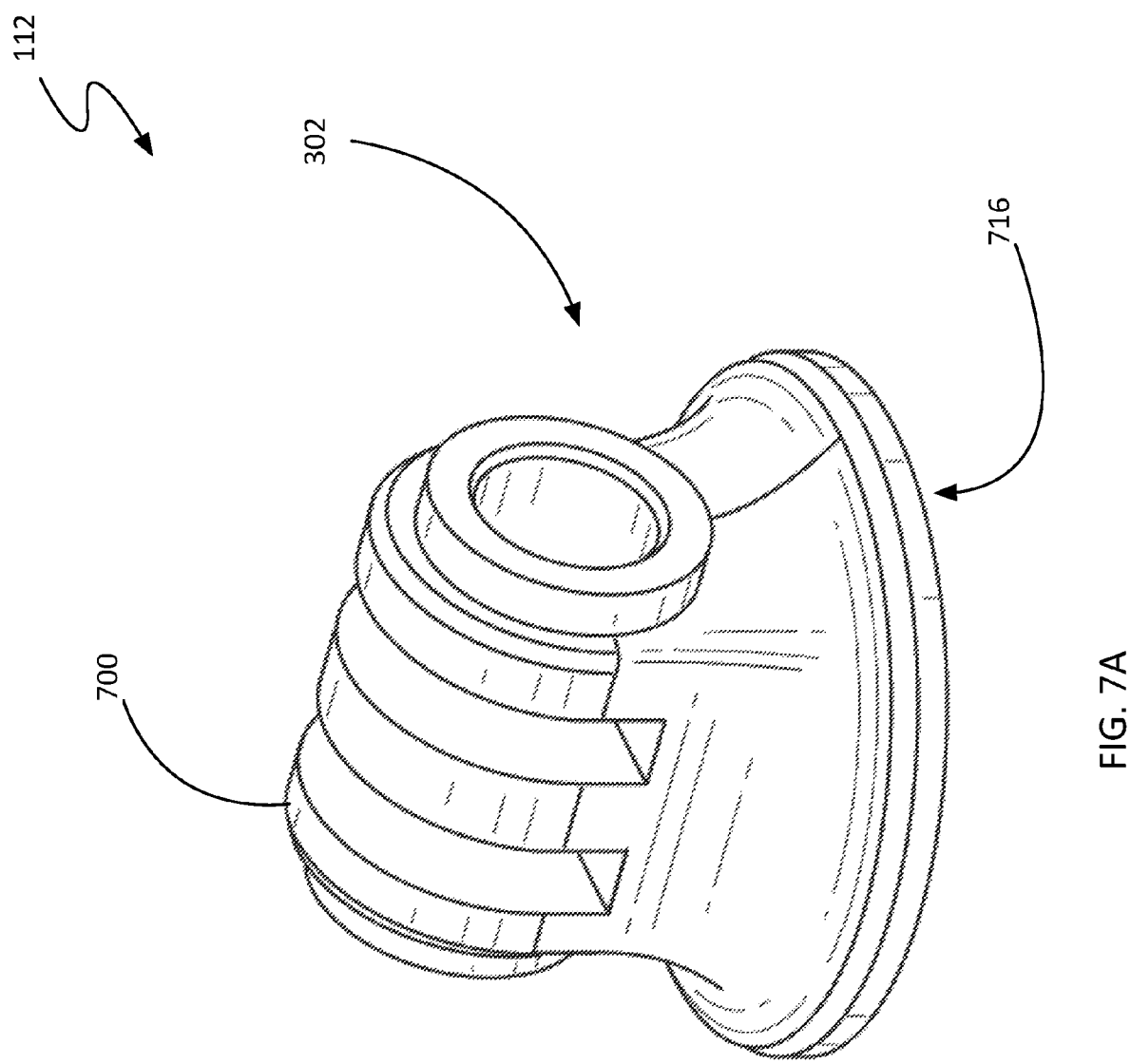

ACCESSORY MOUNT

RELATED APPLICATIONS

This application claims the benefit of U.S. provisional patent application 62/216,276, filed Sep. 9, 2015 titled "Universal Accessory Mount," the entirety of the disclosure of which is hereby incorporated by this reference.

TECHNICAL FIELD

Aspects of this document relate generally to accessory mounts.

BACKGROUND

As video recorders have decreased in size and cost, their use in conjunction with athletic and recreational activities has increased. In particular, they are often used to record activities that involve increased speed (e.g. riding a conveyance such as a mountain bike, snowboard, etc.) and/or risk (e.g. activities requiring protective gear such as a helmet, etc.). The characteristics that make these activities worthy of recording often necessitate that a participant keep their hands free and their focus undivided. Therefore, a need exists for a way to mount a camera or other accessory to the equipment associated these and other activities.

Some conventional accessory mounts are permanent (e.g. permanently formed as part of a helmet), making them hard to use with different equipment, and limiting the user to a single mounting point. Other conventional accessory mounts are overly temporary; their attachment to a piece of equipment or other anchor does not remain tight enough to prevent eventual slipping and/or rattling, degrading accessory performance and putting the accessory and wearer at risk. In both cases, it can be difficult to set and/or maintain the accessory in an optimal orientation. Furthermore, many conventional mounts are for a specific device (e.g. a specific camera model) and/or mounting target (e.g. helmet, bicycle, etc.). Participants in these activities often have needs beyond capturing their adventures on video, and require a way to easily mount a variety of accessories such as cameras, lights, GPS receivers, and radios on a variety of equipment. Conventional mounts are often difficult to modify, or too specialized to be used outside a particular context.

SUMMARY

According to one aspect, an accessory mount includes a base, an accessory receiver, a foot, and at least two elastic bindings. The base includes a plurality of attachment points symmetrically distributed at different locations around all sides of a perimeter of the base. The base also includes at least one opening extending through the base. The accessory receiver includes an accessory adapter at a first end and a base connector at a second end opposite the first end. The accessory receiver is configured to rotatably couple an accessory to the base. The foot is coupled to the base opposite the accessory receiver. The foot includes a non-slip surface on a first side and a plurality of projections extending toward the base on a second side, opposite the first side. The plurality of projections mate with a corresponding plurality of recesses in a bottom surface of the base. The elastic bindings each have a first end and a second end, opposite the first end. The first end is configured to releasably and directly attach to a first attachment point of the plurality of attachment points. The second end is configured to releasably and directly attach to a second attachment point of the plurality of attachment points opposite the first attachment point.

Particular embodiments may comprise one or more of the following features. The accessory adapter may further include an annular channel in a bottom surface. The annular channel may include a first end and a second end. The base connector may include a stop extending from a top surface of the base connector. The accessory adapter and the base connector may be rotatably coupled to each other through the stop mating with the annular channel. Additionally, the stop may move along the annular channel as the accessory adapter rotates with respect to the base connector about an axis. A range of rotation of the accessory adapter with respect to the base may be limited to an angle, measured from the axis, subtended by a segment of the annular channel accessible to the stop between the first end and the second end. The range of rotation may be between 240 and 300 degrees. The accessory adapter may include at least one tooth on its bottom surface. The at least one tooth may be engaged with another at least one tooth on the top surface of the base connector, such that rotation of the accessory adapter with respect to the base may be resisted. The accessory adapter may rotatably mount to the base connector. The base may be stiffer than the foot. The accessory receiver may include three ring prongs that may extend from the first end of the accessory receiver and away from the second end of the accessory receiver. Also, the plurality of attachment points may include at least five attachment points. The base and the foot may be circular, the plurality of attachment points may include eight attachment points, and the accessory adapter may be rotatably coupled to the base connector. Finally, the base connector may be coupled to the base, but does not rotate with respect to the base.

According to another aspect, an accessory mount includes a base, an accessory receiver, a foot, and at least two elastic bindings. The base includes a plurality of attachment points symmetrically distributed at different locations around a majority of a perimeter of the base. The base also includes at least one opening extending through the base. The accessory receiver includes an accessory adapter at a first end and a base connector at a second end opposite the first end. The accessory receiver is configured to rotatably couple an accessory to the base.

The foot is coupled to the base opposite the accessory receiver, and includes a non-slip surface on a first side and a plurality of projections extending toward the base on a second side, opposite the first side. The plurality of projections mate with a corresponding plurality of recesses in a bottom surface of the base. The elastic bindings each have a first end and a second end, opposite the first end. The first end is configured to releasably and directly attach to a first attachment point of the plurality of attachment points, and the second end is configured to releasably and directly attach to a second attachment point of the plurality of attachment points opposite the first attachment point.

Particular embodiments may be modified or adapted such that the accessory may be at least one of a camera, a light, a phone, a GPS receiver, and a portable electronic device.

According to yet another aspect, an accessory mount includes a base, an accessory receiver, and a foot. The base is circular, and includes at least five attachment points distributed at different locations around the base. The base also includes at least one opening extending through a center of the base. The accessory receiver includes an accessory adapter at a first end and a base connector at a second end opposite the first end. The accessory receiver is configured to rotatably couple an accessory to the base. Finally, the foot is coupled to the base opposite the accessory receiver, and includes a non-slip surface on a first side and a plurality of projections extending toward the base on a second side, opposite the first side. The plurality of projections mate with a corresponding plurality of recesses in a bottom surface of the base.

Particular embodiments may comprise one or more of the following features. The accessory mount may include at least two elastic bindings, each having a first end and a second end, opposite the first end. The first end may be configured to releasably and directly attach to a first attachment point of the plurality of attachment points, and the second end may be configured to releasably and directly attach to a second attachment point of the plurality of attachment points opposite the first attachment point. The at least one opening extending through the center of the base may include an internal lip which narrows the at least one opening. A bottom surface of the base connector may include at least two tabs. The base connector may be non-circular. The base may further include a non-circular recess centered on the at least one opening, and the non-circular recess may match the shape of the non-circular base connector. Finally, the base connector may be seated in the non-circular recess of the base and may be releasably coupled to the base by the at least two tabs expanding within the at least one opening after passing the internal lip.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and:

FIG. 5C is a bottom view of a base;

FIG. 6B is a top view of a base connector;

FIG. 7A is a perspective view of an accessory adapter;

DETAILED DESCRIPTION

Figure 1:
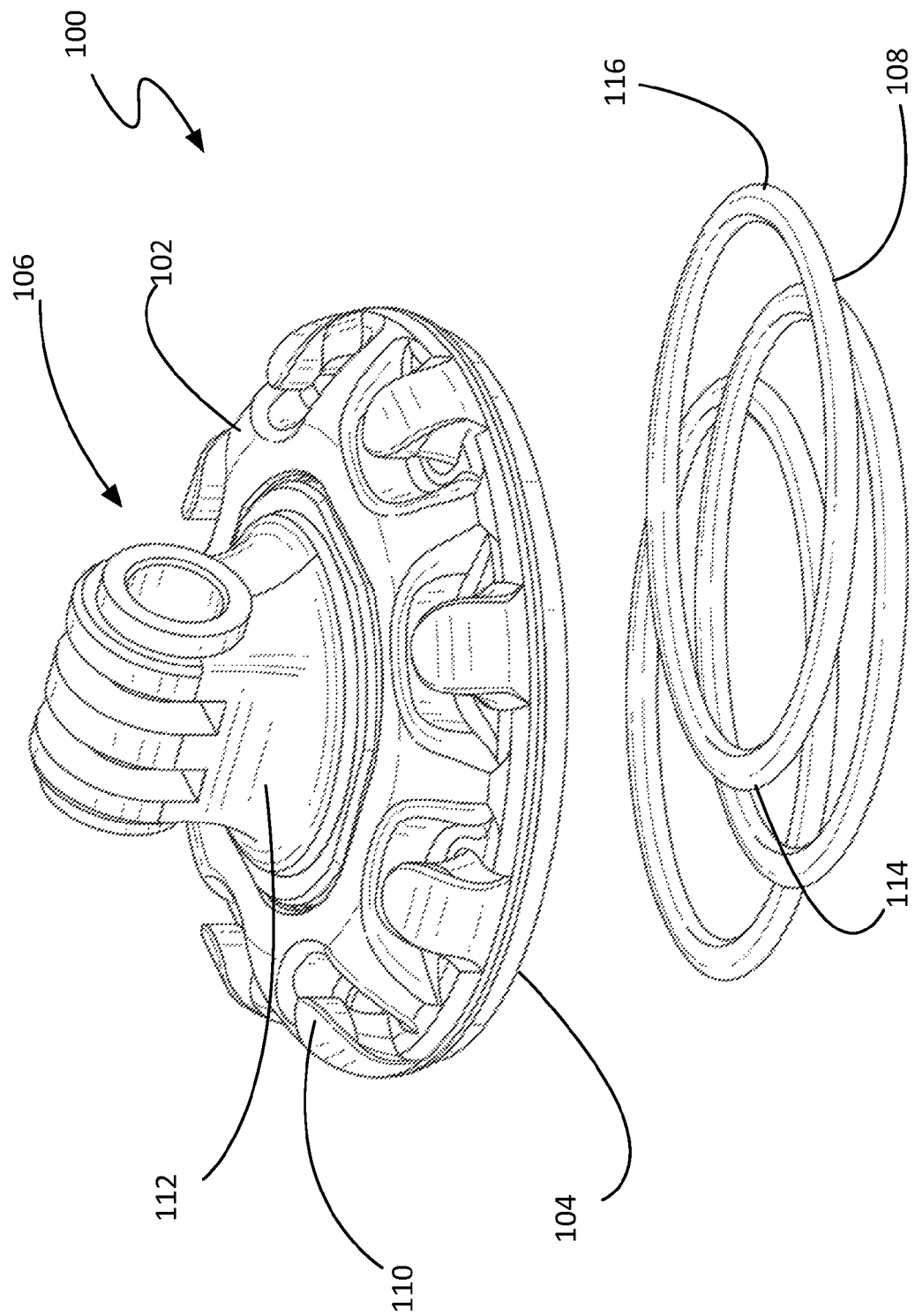
FIG. 1 is a perspective view of an accessory mount.

This disclosure, its aspects and implementations, are not limited to the specific accessory mount types, or other system component examples, or methods disclosed herein. Many additional components, manufacturing and assembly procedures known in the art consistent with accessory mounts are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Figure 2:
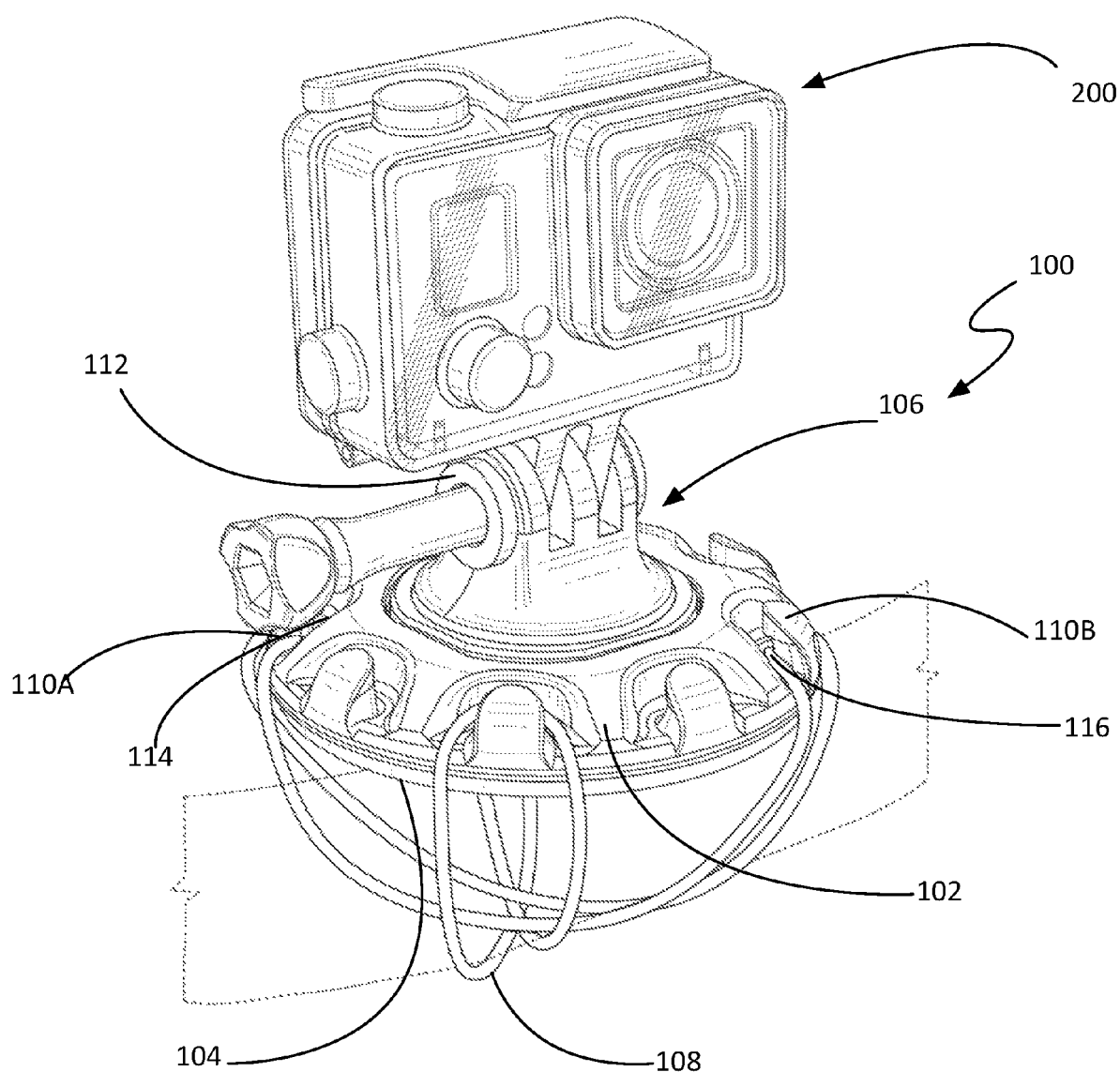
FIG. 2 is a perspective view of an accessory mount with engaged elastic bindings.
Figure 3:
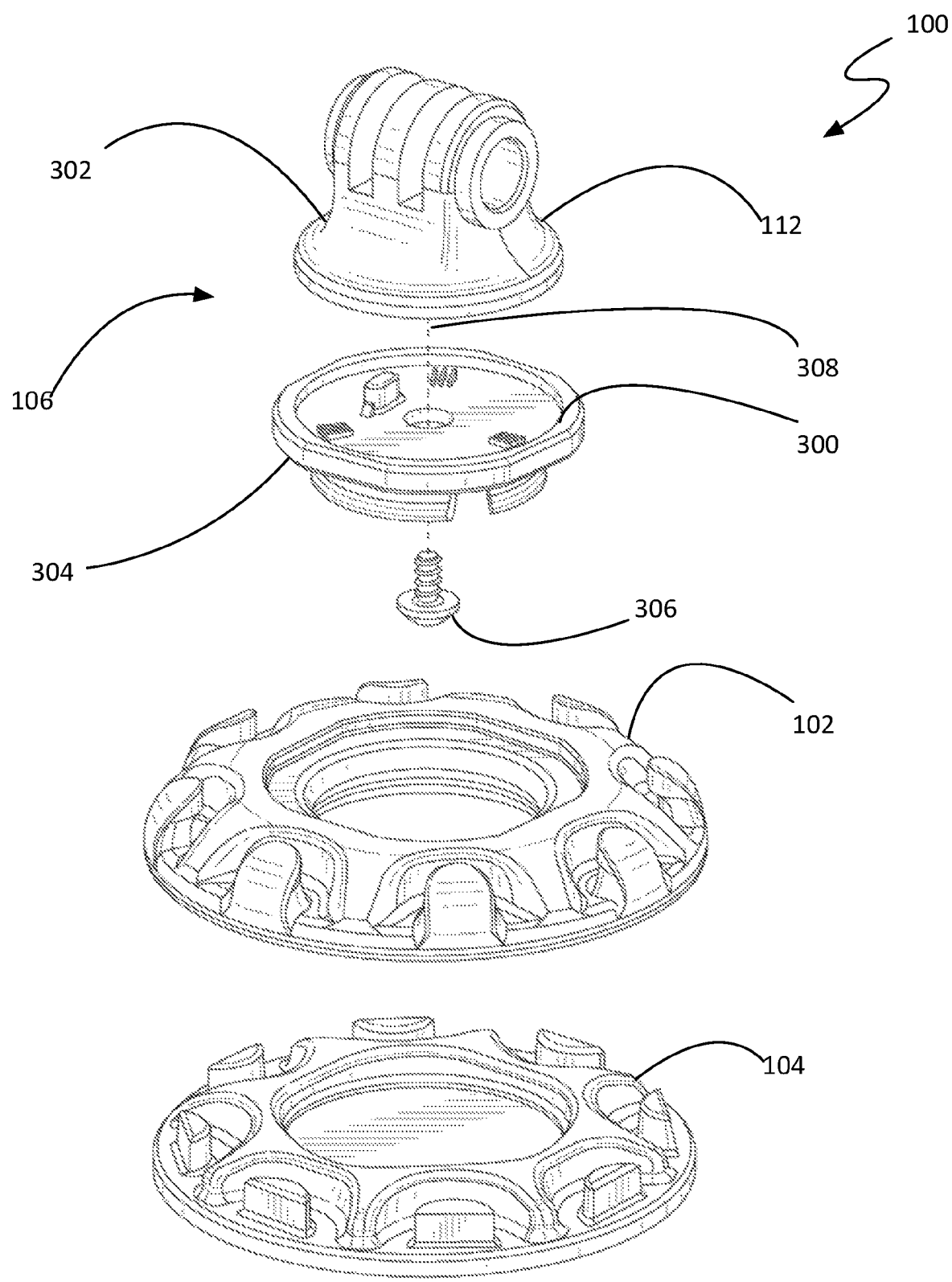
FIG. 3 is an exploded view of an accessory mount.

FIGS. 1 through 3 depict a non-limiting embodiment of an accessory mount 100, having a foot 104, a base 102, an accessory receiver 106, and elastic bindings 108. As shown, the base 102 is disposed over the foot 104, while the accessory receiver 106 is on top of, and coupled to, the base 102. As shall be described in greater detail with respect to FIGS. 5A-5D, the base 102 also comprises a plurality of attachment points 110.

As shown in FIG. 2, an accessory mount 100 may be used to couple an accessory 200 to an anchor 202. In the context of the present disclosure, an anchor refers to any object to which an accessory mount may be coupled to for stability in supporting an accessory being mounted to something. The accessory mount 100 is advantageous as it may be coupled to a variety of anchors, including but not limited to helmets and other safety gear, various parts of a bicycle (e.g. handlebars, frame, tubing, rack, etc.), vehicles (e.g. ATVs, snowmobiles, boats, motor vehicles, etc.), drones and other devices, tree branches, shelters, blinds, and other frames or structures.

FIG. 2 illustrates an accessory 200 attached to an accessory mount 100 bound to an anchor 202 by elastic bindings 108, according to one embodiment. The accessory 200 depicted in FIG. 2 is a camera, similar to the camera 800 of FIG. 8. According to various embodiments, the accessory 200 may be one of a variety of objects. Example accessories include, but are not limited to, cameras, lights, radios, GPS receivers, portable electronic devices, tablets, personal electronics, phones, sensors, and other devices.

As shown in the non-limiting embodiment of FIG. 2, the accessory 200 is attached to the accessory receiver 106 of an accessory mount 100. Specifically, the accessory 200 is attached to the accessory adapter 112, which will be discussed in greater detail with respect to FIGS. 7A-7D. The accessory adapter 112 is coupled to the base 102 through the base connector 300 (seen in FIG. 3, but not visible in FIGS. 1 and 2). The base 102 is held against the foot 104 by tension of the elastic bindings 108. The foot 104 conforms to and grips the surface of the anchor 202, preventing the mount 100 from sliding or rattling against the anchor 202 while in use, according to various embodiments. The foot shall be described in greater detail with respect to FIGS. 4A-4C.

The non-limiting embodiment depicted in FIG. 2 shows elastic bindings 108 wrapped around an anchor 202, attached to some of the attachment points 110 of the base 102. According to various embodiments, each elastic binding 108 comprises a first end 114 and a second end 116 opposite the first. In the embodiment shown in FIG. 1, the elastic bindings 108 are circular; in such a case, the first end 114 and the second end 116 may be thought of as opposite points on the circle. As the first end 114 and the second end 116 are separated, the circular elastic binding 108 will stretch and take on a more linear form.

In other embodiments, the elastic bindings 108 may have other forms. For example, in one embodiment, the bindings 108 may resemble elastic straps with a loop or hook located at the first end 114 and the second end 116. According to various embodiments, the elastic bindings 108 are composed of an elastic material. In the context of the present description, elastic refers to the binding's ability to spontaneously resume its original shape after elongation or other distortion. The force driving the return to an initial shape provides the tension that holds an accessory mount 100 tight against an anchor 202.

As shown in FIG. 2, the first end 114 and second end 116 of an elastic binding 108 are attached to attachment points 110A and 110B, after the binding is wrapped around the anchor 202. According to various embodiments, the elastic binding 108 may be selected from a variety of bindings, depending upon a variety of factors (e.g. length needed, weight of the accessory, operating temperature, etc.). In some embodiments, the elastic bindings 108 may be stored inside an accessory mount 100 when not in use (e.g. between the foot 104 and the base 102, etc.).

Those skilled in the art will recognize that the elastic bindings 108 may be replaced with other types of binding in other embodiments, including bindings that are not composed of elastic material, but are otherwise able to maintain tension, such as cables with a ratcheting device.

Figure 4A:
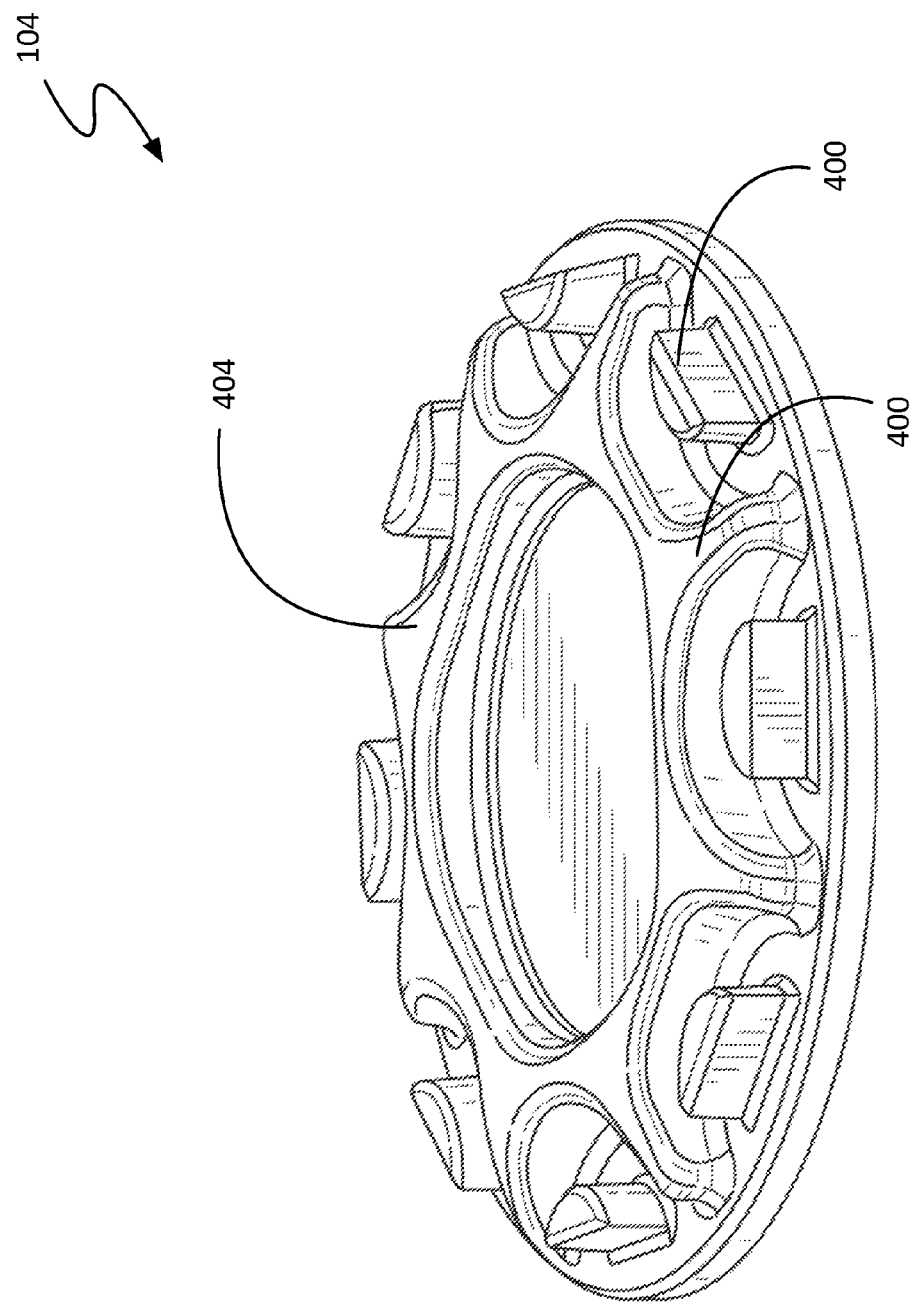
FIG. 4A is a perspective view of a foot.
Figure 4B:
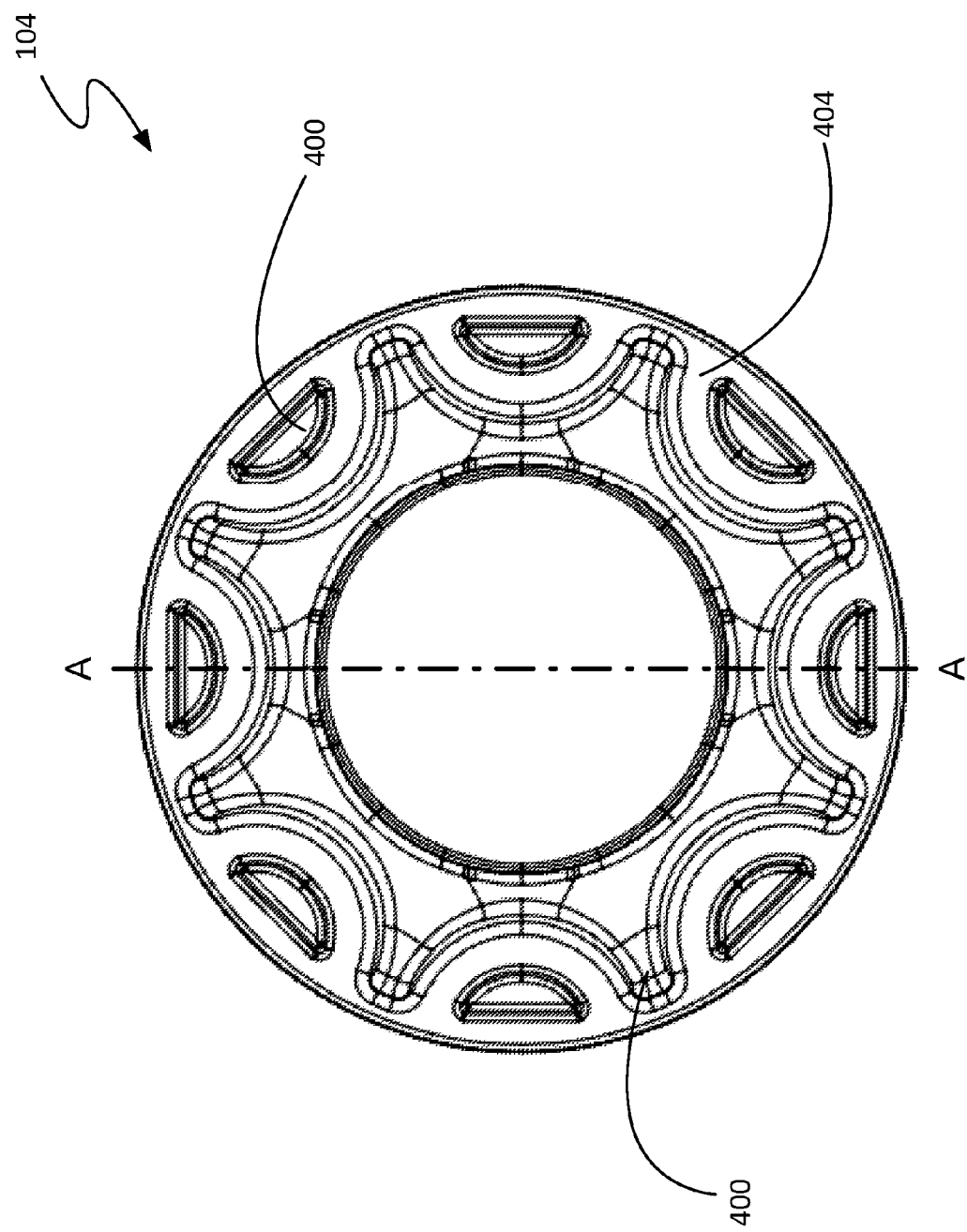
FIG. 4B is a top view of a foot.
Figure 4C:
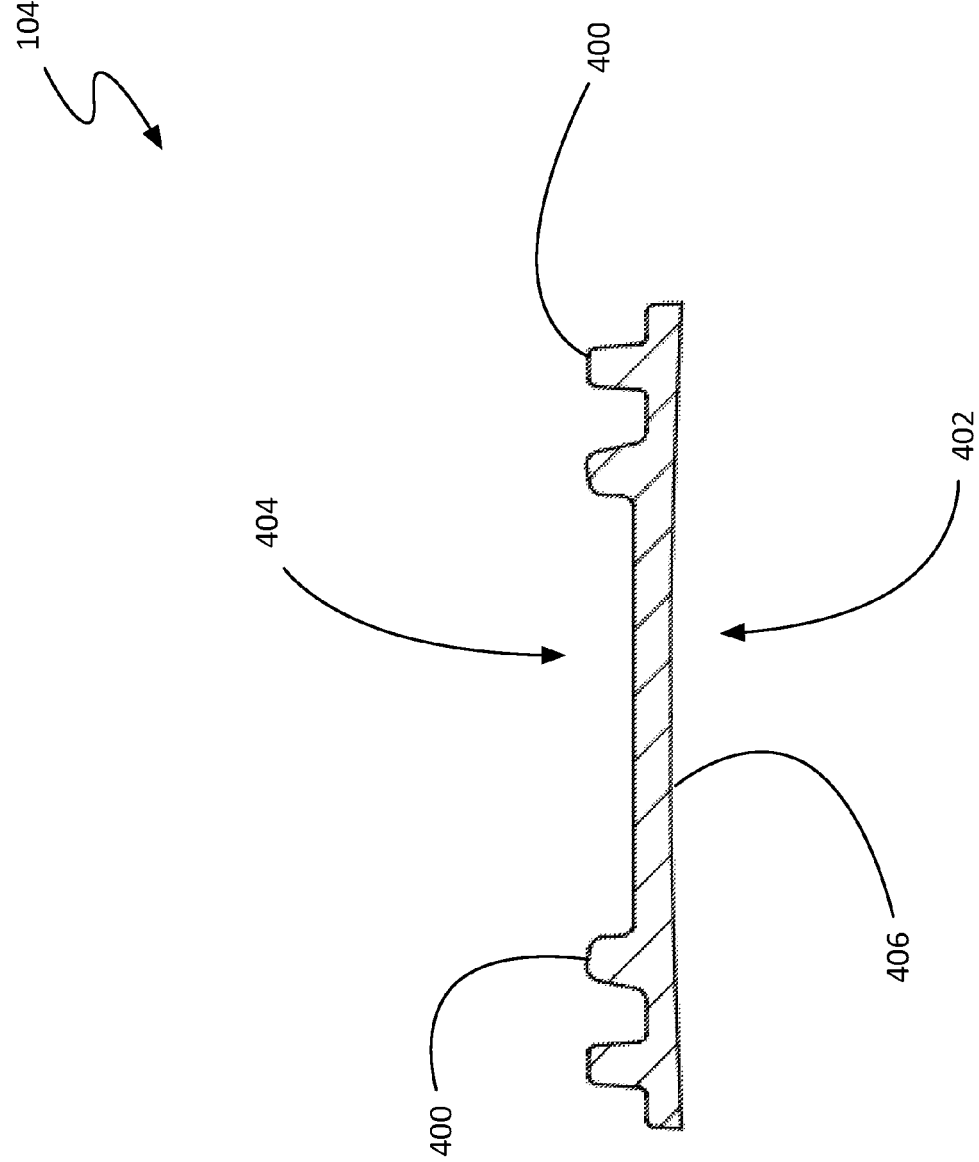
FIG. 4C is a cross section view of a foot along line A-A of FIG. 4B.

FIGS. 4A-4C illustrate a non-limiting embodiment of a foot 104. As shown, the foot 104 comprises a non-slip surface 406 on a first side 402, or bottom, and a plurality of projections 400 on a second side 404, or top. According to various embodiments, the foot 104 is flexible; specifically, the foot 104 is not as stiff as the base. In the context of the present description and the claims that follow, stiffness refers to a measure of the resistance offered by a body to deformation. Stiffness depends upon the shape and boundary conditions of a body, in addition to the properties of the constituent material. For example, to objects made of the same material may differ in stiffness, depending upon their geometry. In various embodiments, the foot 104 may be less stiff than the base 102 so that it may conform, at least partially, to the surface of an anchor 202, increasing the surface area of contact and thus improving grip. Furthermore, a foot 104 with elastic properties may dampen vibrations being translated from an anchor 202 to which an accessory mount 100 is coupled (e.g. the vibrations of a helmet in use, the handlebars of a mountain bike on a descent, etc.).

In some embodiments, a foot 104 may be composed of an elastomeric material such as natural or synthetic rubber. In a specific embodiment, a foot 104 may be composed of silicone rubber having a durometer hardness of 40 Shore A. In another specific embodiment, a foot 104 may be composed of an elastomer having a durometer hardness between 30 to 50 Shore A. In other embodiments, a foot 104 may be composed of other materials that are durable as well as flexible. In some embodiments, a foot 104 may be composed of a material chosen for a particular use environment, such as the low temperatures experienced on a snowmobile or the wet surfaces of a boat.

The foot 104 helps secure the accessory mount 100 to an anchor 202 by reducing the likelihood of the mount 100 slipping or otherwise moving around on the surface of the anchor 202. In some embodiments, the foot 104 may be composed of material that is non-slip, such that the entire bottom, or first side 402, is a non-slip surface 406. In a specific embodiment, the foot 104 may be composed of silicone rubber. In other embodiments, the first side 402 of the foot 104 may comprise a non-slip surface 406. In the context of the present description and the claims that follow, a non-slip surface is a surface that resists sliding. Specifically, a non-slip surface 406 of a foot 104 may be defined as a surface that is less likely to slip than the bottom surface 506 of a base 102 with which the foot 104 is paired. In other words, when comparing the coefficient of friction for a foot 104 on an anchor 202 with the coefficient of friction for a base 102 on the same anchor 202, for likely anchors in likely use conditions, the foot 104 will have a higher coefficient of friction than the base 102.

As shown in FIGS. 4A-4C, the foot 104 comprises a plurality of projections 400. The foot 104 provides stability to the accessory mount 100 by gripping the anchor 202 while being secured to the base 102, according to various embodiments. The foot 104 may improve the grip by slightly conforming to the surface of the anchor 202, increasing the surface area of contact; to do so, the perimeter of the foot 104 is able to separate from the base. Even though the foot 104 and the base 102 may be slightly separated, the base 102 is still prevented from shifting or rotating by the plurality of protrusions 400 extending from the second side 404 of the foot 104. The protrusions 400 mate with a corresponding plurality of recesses 504 in a bottom surface 506 of a base 102, according to various embodiments. The base 102 will be described in greater detail with respect to FIGS. 5A-5D.

According to various embodiments, the size and shape of the protrusions 400 of a foot 104 may depend upon the material used. As previously explained, it is advantageous for a foot 104 to be able to conform to the surface of an anchor 202. In various embodiments, the protrusions 400 may be shaped such that they are stiff enough to prevent the base 102 from moving or rotating with respect to the foot 104, while the foot 104 as a whole may flex to conform to the surface of an anchor 202. The foot 104 illustrated in FIG. 4A comprises a scalloped ring shaped protrusion with eight half moon shaped protrusions; in other embodiments, different, additional, or fewer protrusions may be employed.

In some embodiments, a foot 104 may be fastened or adhered to the base 102 near the center 512. In other embodiments, a foot 104 may be mateably placed in direct contact with the bottom surface of a base, but not permanently attached. For example, in one embodiment, the friction between a foot 104 and a base 102, specifically the protrusions 400 of the foot 104 and the recesses 504 of the base 102, may be sufficient to keep the two objects joined when the accessory mount 100 is not in use. As an option, elastic bindings may be stored between a foot 104 and a base 102 when not in use.

FIG. 4C illustrates a cross section view of a non-limiting embodiment of a foot 104, taken along line A-A of FIG. 4B. As shown, the foot 104 is relatively thin; in this particular embodiment, the foot 104 is roughly half the thickness of a corresponding base 102. In some embodiments, the thickness of a foot 104 may be determined by the material used (e.g. considerations of stiffness previously discussed, etc.).

Furthermore, in some embodiments, a foot 104 may be sized such that it is wider than a base 102, to prevent the base 102 from coming into contact with the anchor 202 while the accessory mount 100 is in use, preventing damage to the anchor 202 (e.g. scratching paint, cutting the surface, etc.).

FIGS. 5A-5D illustrate a non-limiting embodiment of a base 102. As shown, the base 102 comprises a plurality of attachment points 110, an opening 500, a plurality of recesses 504 in a bottom surface 506, an internal lip 508, and a non-circular recess 510. The embodiment illustrated has eight attachment points 110. In some embodiments, a base 102 has at least five attachment points and in particular embodiments between five and ten attachment points. In other embodiments, a base may have less than five attachment points.

The base 102 shown in FIGS. 5A-5D is circular, and has attachment points 110 distributed symmetrically around the entire perimeter 502. The circular shape of the base 102 is advantageous, as it provides attachment points 110 in a variety of angular orientations, facilitating the use of the accessory mount 100 with anchors 202 of irregular or unusual shape. Other base 102 shapes may share this benefit, including but not limited to shapes that resemble a circle, but have more sides, such as a hexagonal shape. In some embodiments, other regular and irregular polygons may be used to define the perimeter 502 of a base 102.

Figure 5A:
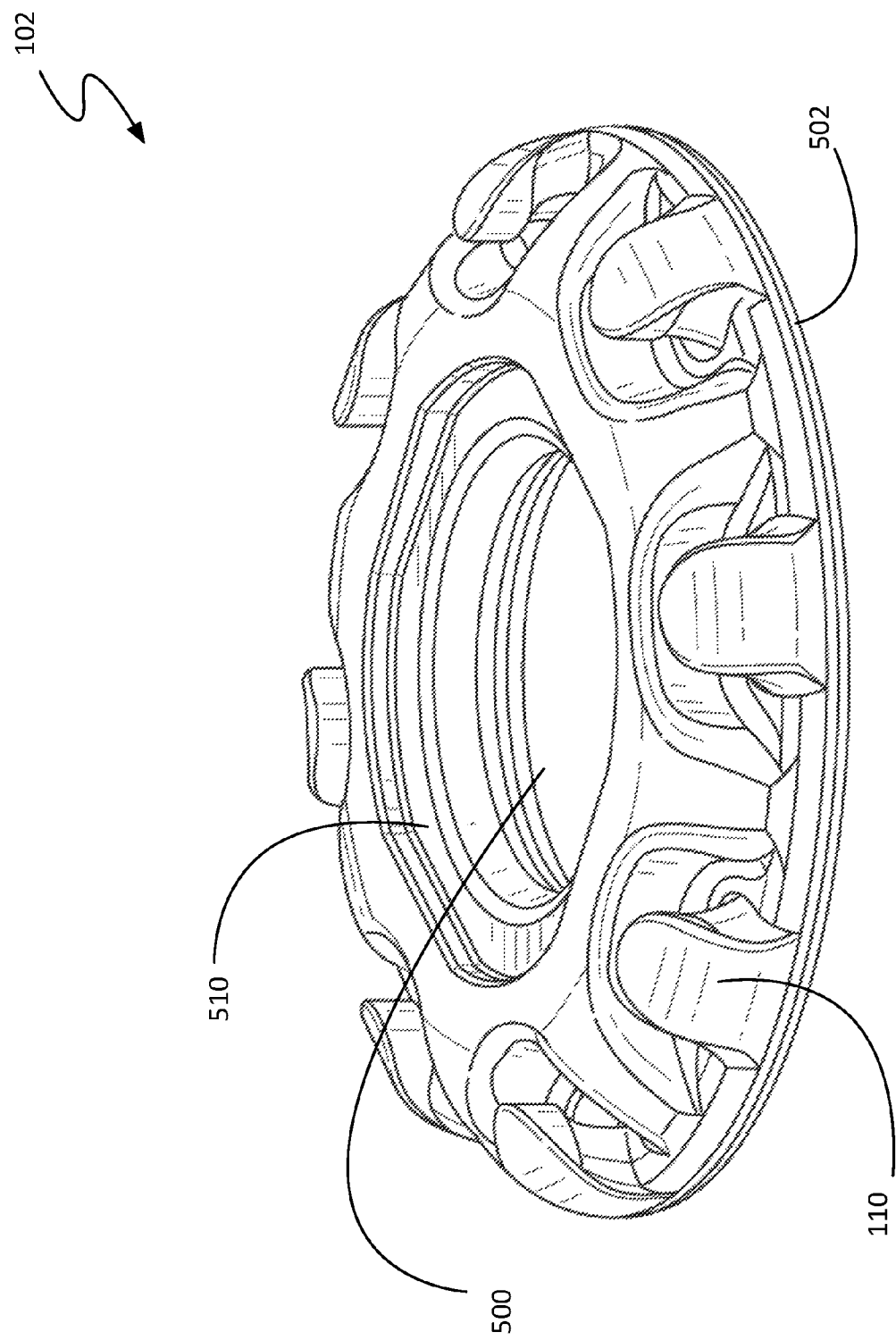
FIG. 5A is a perspective view of a base.
Figure 5B:
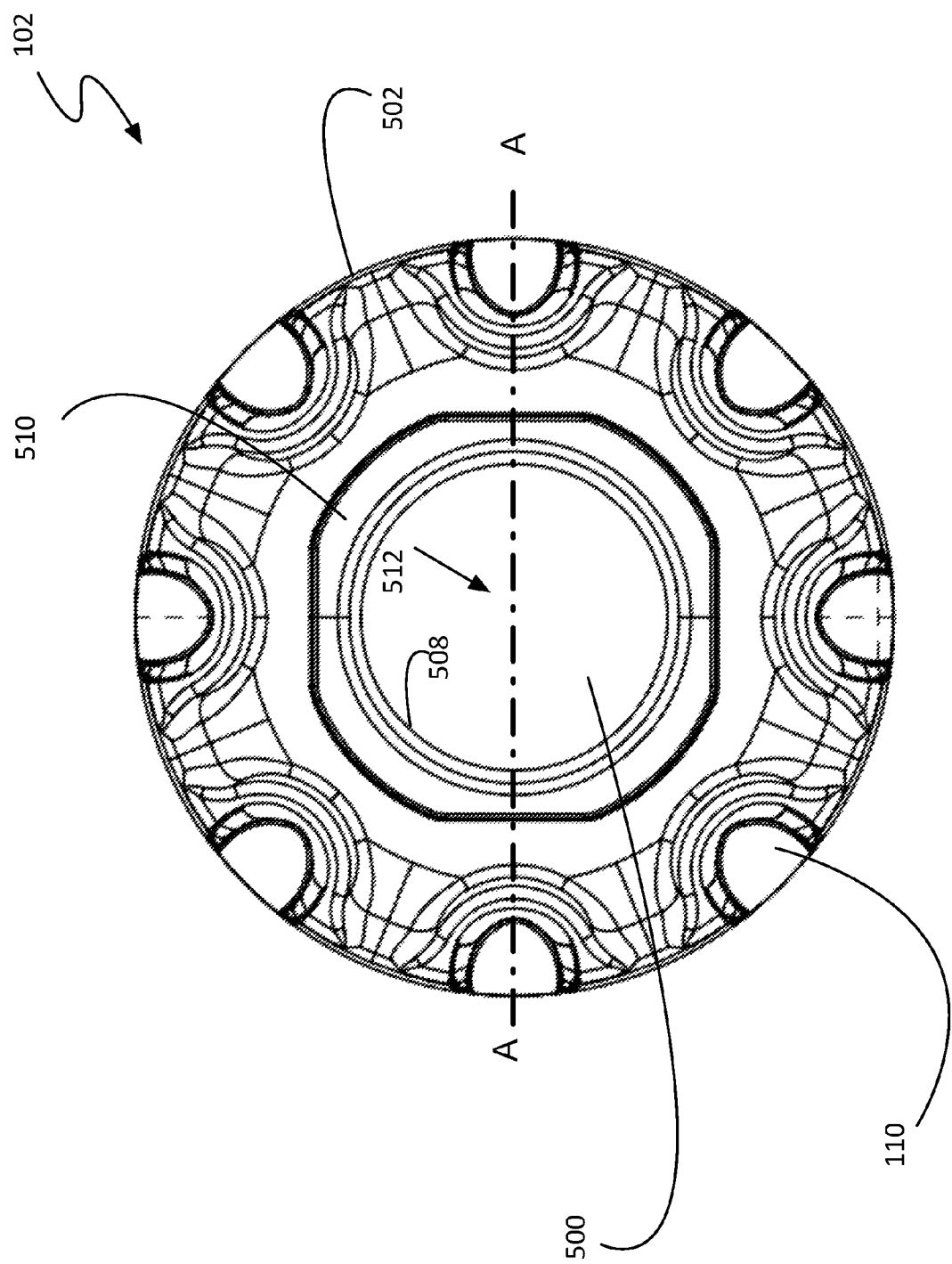
FIG. 5B is a top view of a base.

In the specific non-limiting embodiment illustrated in FIGS. 5A-5B, the attachment points 110 are distributed evenly and symmetrically about the entire perimeter 502 of the base 102. In some embodiments, the attachment points 110 may be distributed symmetrically around a majority of the perimeter 502. In other embodiments, the attachment points 110 may be distributed to different locations around the base 102, which may not be symmetrical and, in some cases which may not be located near the perimeter. For example, in one embodiment, the attachment anchors 110 may be located above and away from the perimeter 502 of a base 102, to give a user easier access. This may be useful in smaller embodiments of an accessory mount 100, where it may be difficult to attach the end of an elastic binding 108 to an attachment point 110 close to the anchor 202.

Referring now to FIG. 5A, a perspective view of a base 102 is illustrated. As shown, the attachment points 110 are shaped to easily receive the end of an elastic binding 108, and keep it from popping out accidentally. In some embodiments, the attachment points 110 of a base 102 may be hook-like in nature, relying on the tension of an engage elastic binding 108 to prevent an end from being released (e.g. the tension must be overcome to move the end of the binding out of the attachment point, etc.). In other embodiments, the attachment points 110 may mechanically capture the ends of an elastic binding 108. For example, in one embodiment, the attachment points 110 may be biased clips that clamp down on the ends of an elastic binding 108. As an option, the ends of the bindings may be expanded such that they cannot slip out of the clip while it is closed.

The base 102 illustrated in FIG. 5A comprises eight attachment points 110. In other embodiments, a base 102 may have more or less than eight attachment points 110. The convenience and versatility provided by additional attachment points 110 must be balanced with the difficulty of using small or crowded attachment points 110. An ideal number of attachment points 110 may depend upon the overall size of the accessory mount 100, the nature of the elastic bindings 108, and/or other considerations.

Referring now to FIG. 5B, a top view of a base 102 is illustrated. As shown, the base 102 has an opening 500 that extends through the base. In some embodiments, the opening 500 may be aligned with the center 512 of a base 102. In other embodiments, the opening 500 may be off-centered. In some embodiments, the opening 500 may be for a fastener, to couple an accessory receiver 106, or at least a base connector 300 (e.g. the base connector 300 of FIG. 3, etc.) to the base 102. In other embodiments, the opening 500 may be sized and shaped to receive part of an accessory receiver 106, such as a base connector 300. The base connector 300, as well as the non-circular recess 510 and internal lip 508 of the base 102, will be discussed in greater detail with respect to FIGS. 6A-6D.

Referring now to FIG. 5C, a bottom view of a base 102 is illustrated. As shown, the bottom surface 506 of the base 102 comprises a plurality of recesses 504 which correspond to and are mateable with the plurality of projections 400 of a foot 104. The mating of the projections 400 with the recesses 504 may prevent the base 102 from shifting or rotating with respect to the foot 104, according to various embodiments. In some embodiments, the recesses 504 in the bottom surface 506 of a base 102 may be shaped to store unused elastic bindings 108 while the foot 104 is coupled to the base 102.

Figure 5D:
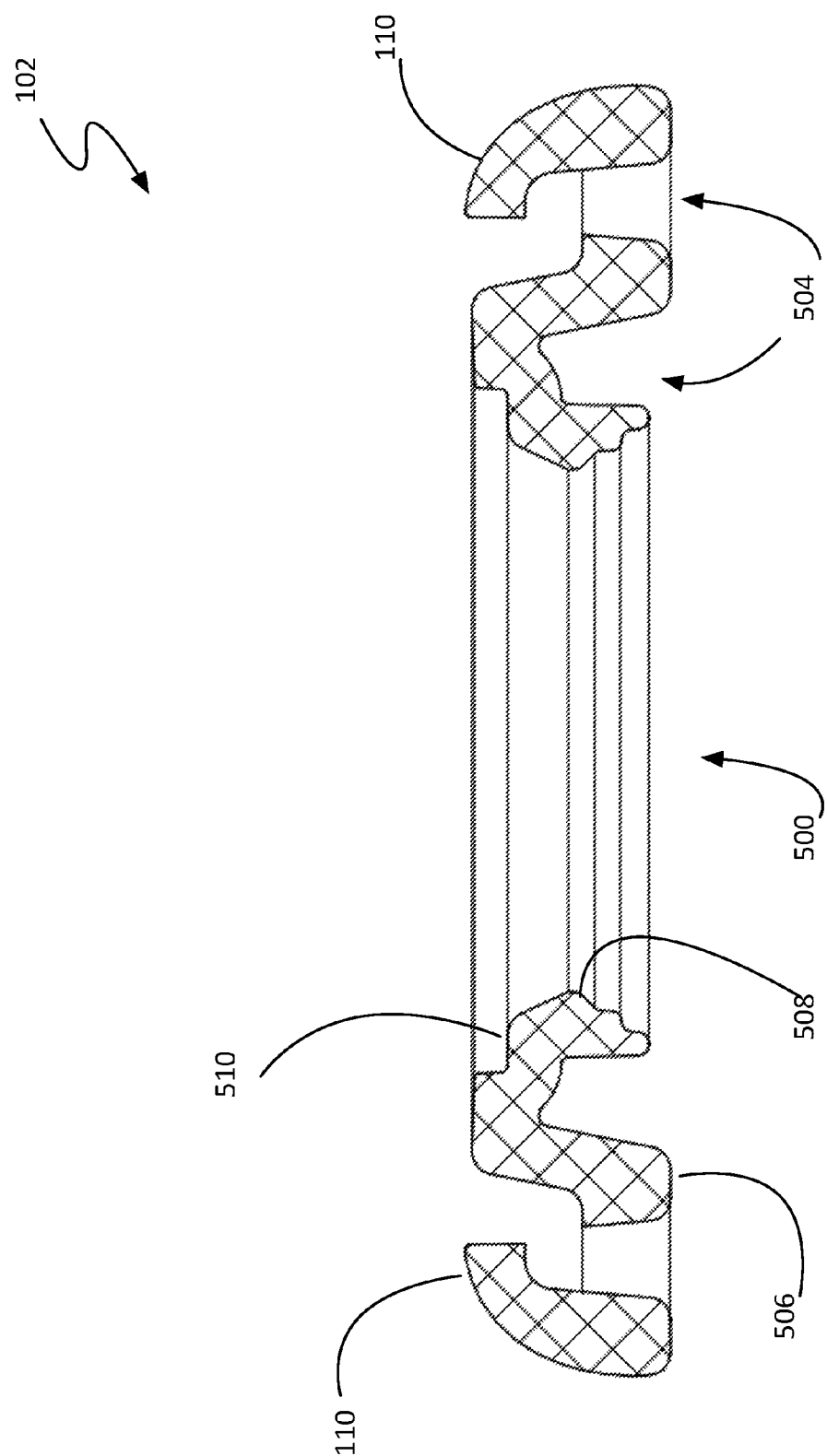
FIG. 5D is a cross section view of a base along line A-A of FIG. 5B.

FIG. 5D is a cross section view of a base 102 taken along the line A-A of FIG. 5B. The cross section makes the hook-like nature of the attachment points 110 of this non-limiting embodiment more evident. According to various embodiments, the attachment points 110, as well as the rest of the base 102 and the accessory receiver 106 and its components, may be composed of material which is strong enough to withstand the forces exerted by the elastic bindings 108 when engaged, as well as the torque applied by the accessory 200 attached. In some embodiments, a thermoplastic may be used. Examples include, but are not limited to, polyvinyl chloride, polycarbonate (PC), and acrylonitrile butadiene styrene (ABS). In a specific embodiment, one or more of the components of an accessory mount 100 may be composed of PC-ABS, a blend of PC and ABS that exhibits the processing ease of ABS and the mechanical properties of PC. In some embodiments, these components may be injection molded.

As shown in FIGS. 1-3, an accessory mount 100 comprises an accessory receiver 106. According to various embodiments, including the embodiment illustrated in FIG. 3, an accessory receiver 106 comprises an accessory adapter 112 at a first end 302 and a base connector 300 at a second end 304 opposite the first end 302. The accessory receiver 106 allows an attached accessory 200 to rotate with respect to the base 102. In some embodiments, the accessory adapter 112 may be fixed with respect to the base connector 300, meaning they do not rotate with respect to each other. In such embodiments, the accessory receiver 106 may be rotateably coupled to the base 102 at the base connector 300. For example, in one embodiment, a fastener passing through the opening 500 of a base 102 may rotateably couple the base 102 to an accessory receiver 106. In some embodiments, the accessory adapter 112 and the base connector 300 may be parts of a single piece that forms an accessory receiver 106. In other embodiments, the accessory adapter 112 and the base connector 300 may be separately formed pieces coupled together to form an accessory receiver 106.

In other embodiments, including the non-limiting embodiment illustrated in FIG. 3, the accessory adapter 112 may be rotateably coupled to the base connector 300. In other words, the accessory adapter 112 and an attached accessory 200 may both rotate together on an axis 308 with respect to the base connector 300 and the base 102; the base connector 300 and the base 102 do not rotate with respect to each other.

Figure 6A:
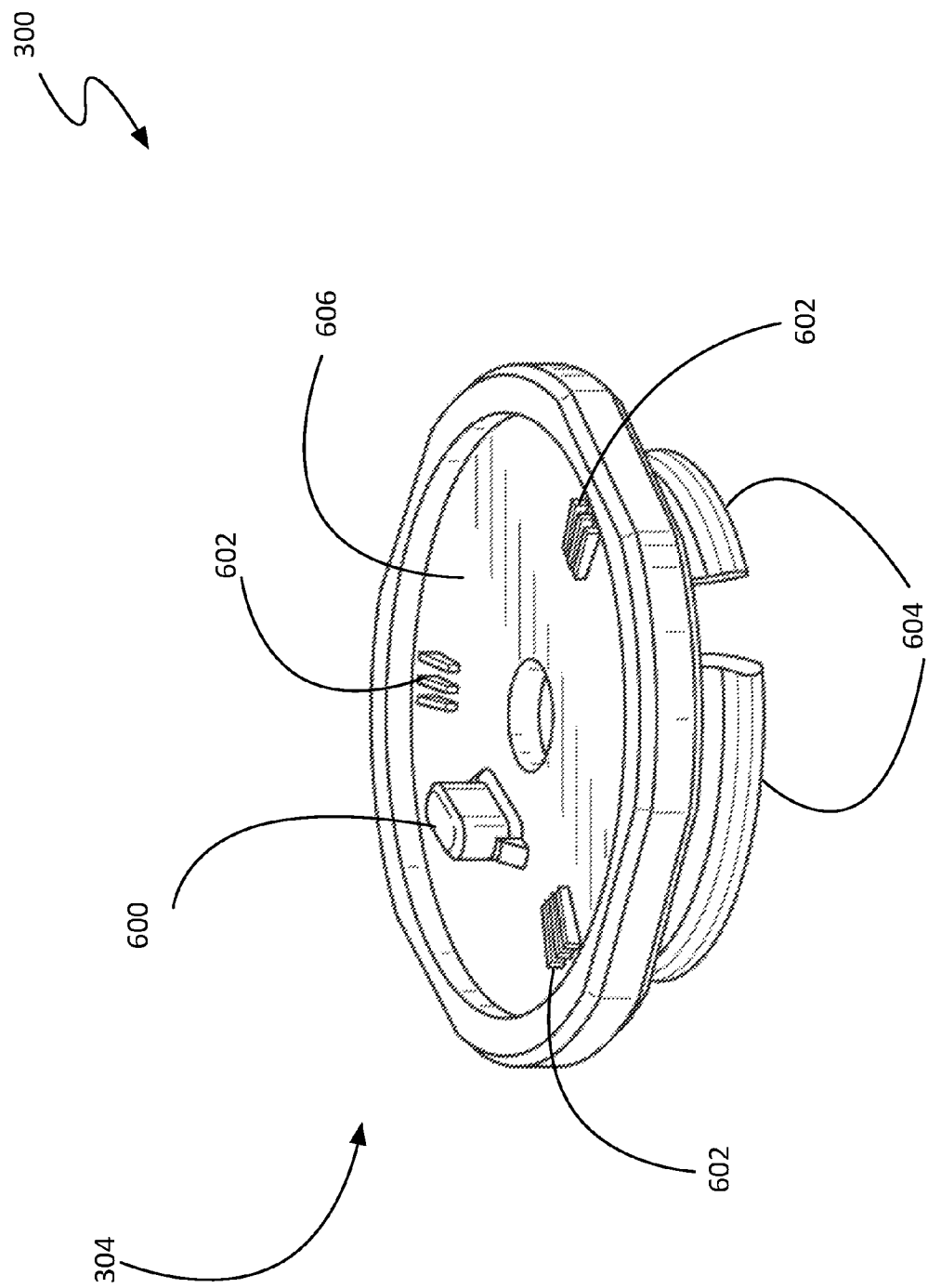
FIG. 6A is a perspective view of a base connector.

FIGS. 6A-6D illustrate a non-limiting embodiment of a base connector 300. FIG. 6A is a perspective view of a base connector 300, and FIG. 6B is a top view of the same. As shown, the base connector 300 comprises a top surface 606 and a bottom surface 608. The top surface 606 of the base connector 300 comprises a stop 600 and at least one tooth 602. The bottom surface 608 comprises a plurality of tabs 604. The stop 600 and the at least one tooth/teeth 602 will be discussed in greater detail with respect to FIGS. 7B and 7D.

FIG. 6B is a top view of a non-limiting embodiment of a base connector 300. As shown, the base connector 300 has a hole in the center; according to some embodiments, a base connector 300 may be rotateably coupled to an accessory adapter 112 by a fastener, such as the fastener 306 of FIG. 3, passing through a hole in the base connector 300. In other embodiments, a base connector 300 and an accessory adapter 112 may be rotateably coupled by any other method known in the art.

As shown in FIG. 6B, the base connector 300 has a shape that is roughly octagonal. This shape corresponds to the non-circular recess 510 found in the top of the base 102 illustrated in FIG. 5B. In various embodiments where the base connector 300 and the base 102 do not rotate with respect to each other, a part of one component, such as the perimeter of the base connector 300 of FIG. 6B, may be given a non-circular shape (e.g. octagonal, etc.) such that it may be seated within a non-circular recess, such as the recess 510 of FIG. 5B, to strengthen the coupled parts against rotational forces. In the case illustrated in the Figures, the base connector 300 of FIG. 6B may be seated in the non-circular recess 510 of base 102 illustrated in FIG. 5B. By seating part of one component in a non-circular recess of another, the rotational torque applied by the attached accessory on the mount 100 while the mount 100 is in motion (or while a user is repositioning the accessory) will not be borne entirely by whatever is fastening the base connector 300 to the base 102, according to various embodiments.

As shown in FIGS. 1-3, the accessory receiver 106 is coupled to base 102 through the base connector 300, according to various embodiments. In some embodiments, a base connector 300 may be permanently fastened or adhered to a base 102. In other embodiments, a base connector 300 may be releasably coupled to a base 102. A releasable coupling may be advantageous, as it would allow a user to swap out an accessory receiver 106 configured to hold one type of accessory, like a camera, and install a different accessory receiver 106, perhaps configured to hold a phone.

Figure 6C:
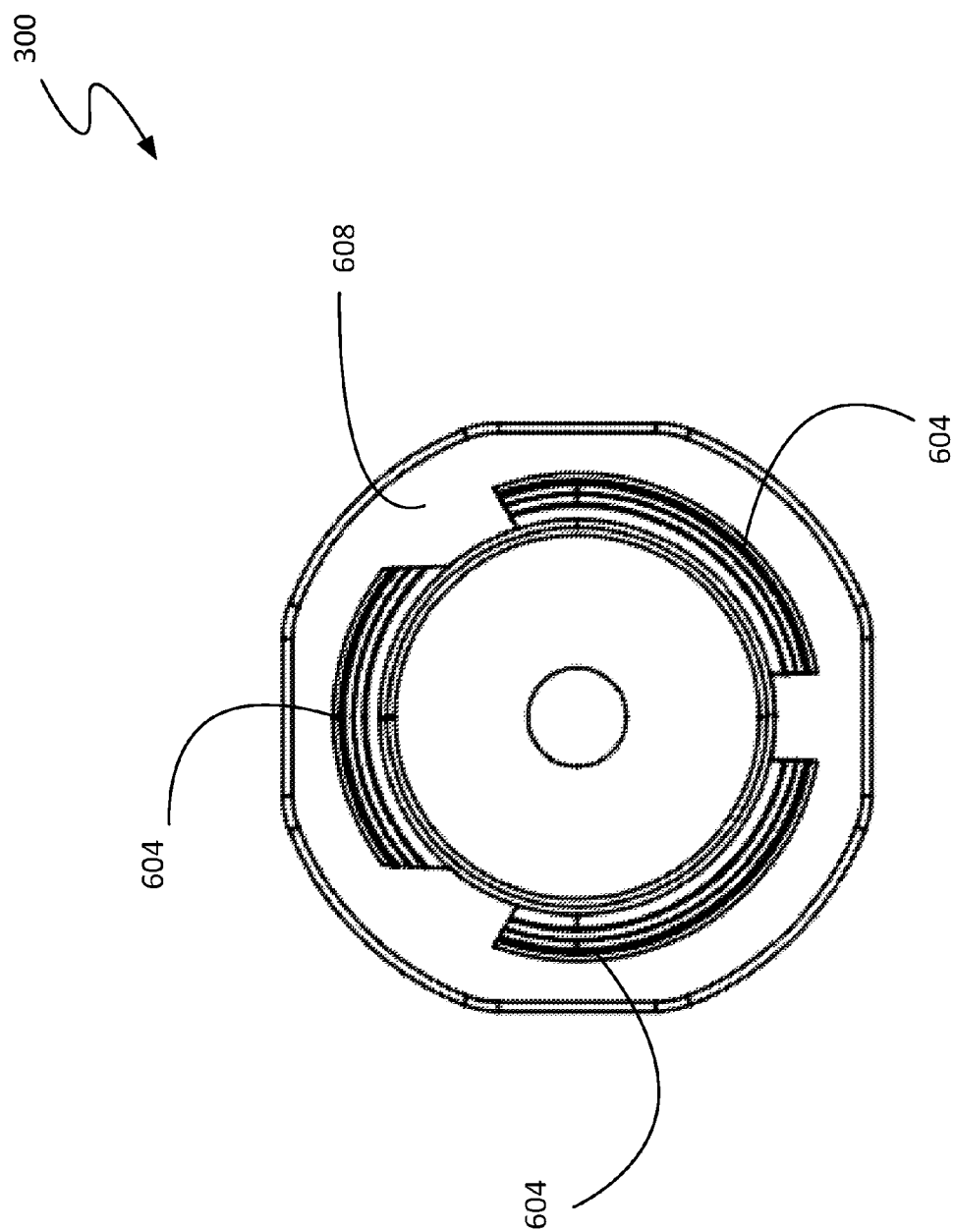
FIG. 6C is a bottom view of a base connector.
Figure 6D:
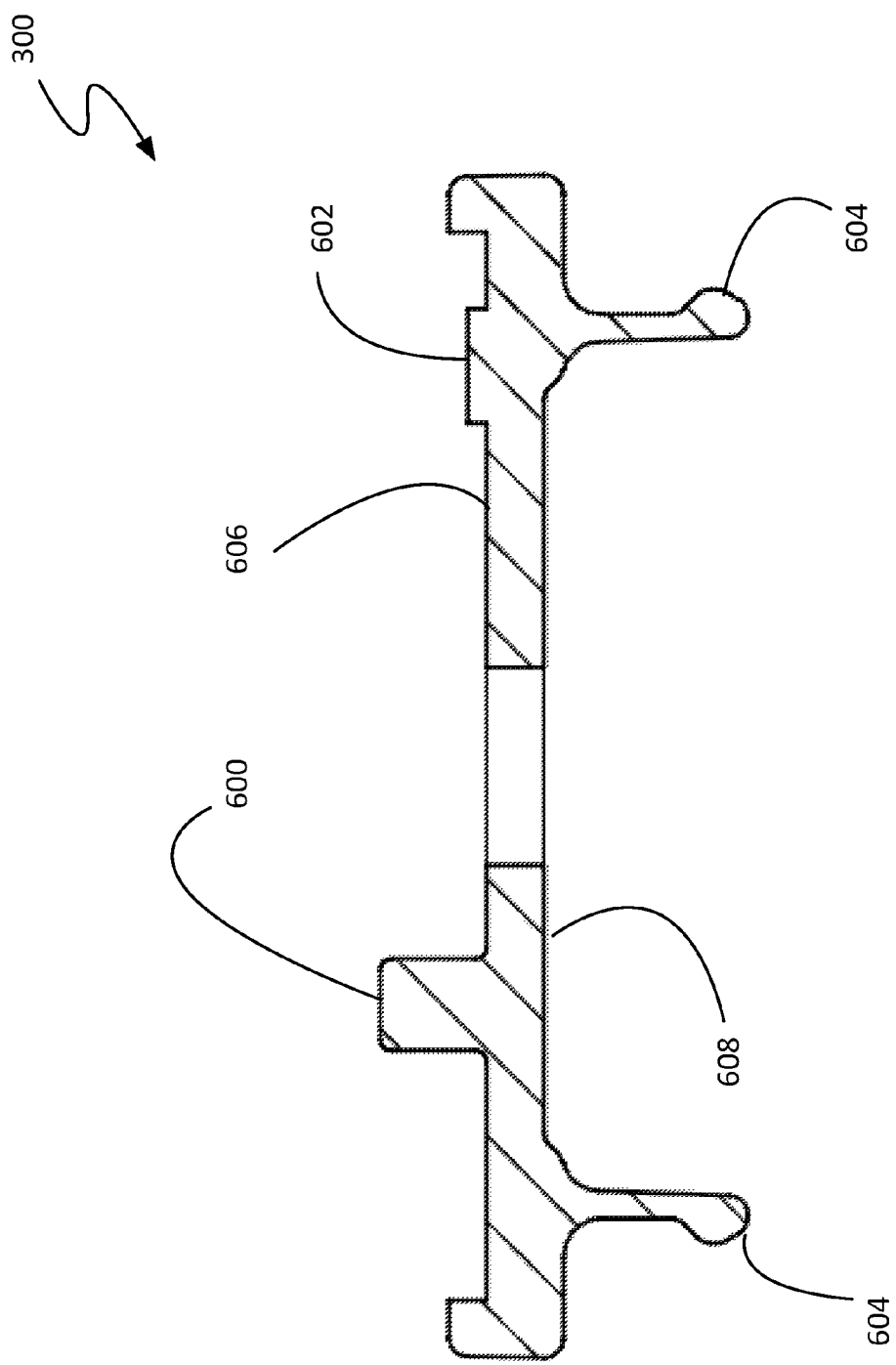
FIG. 6D is a cross section view of a base connector along line A-A of FIG. 6B.

FIG. 6C is a bottom view of a base connector; FIG. 6D is a cross section view of a base connector along the line A-A of FIG. 6B. As shown, the base connector comprises three tabs 604. According to various embodiments, a base connector 300 may comprise a plurality of tabs 604 on a bottom surface 608 of the connector that may interlock with an internal lip, such as the internal lip 508 of the base 102 shown in FIGS. 5A-5D. As the base connector 300 is pressed downward into an opening 500 in the base 102, the tabs 604 may deflect inward until the bulbous ends pass by the internal lip 508, after which they spring outward. The base connector 300 may be held in place by the resistance of the tabs 604 to deflecting inward to get around the internal lip 508 of the base 102. In some embodiments, this coupling may be permanent; in other embodiments, it may be reversible. Those skilled in the art will recognize that the number, size, and shape of the tabs and/or internal lip may be modified according to the intended application of the mount 100 (e.g. anticipated forces, strength/elasticity of base 102 and/or base connector 300 materials, etc.).

FIGS. 7A-7D illustrate a non-limiting embodiment of an accessory adapter 112. As shown, the accessory adapter 112 comprises three ring prongs 700 and a bottom surface 716 that comprises an annular channel 704 and at least one tooth 702. The accessory adapter 112 serves as the interface between an accessory 200 and an accessory mount 100.

Figure 7B:
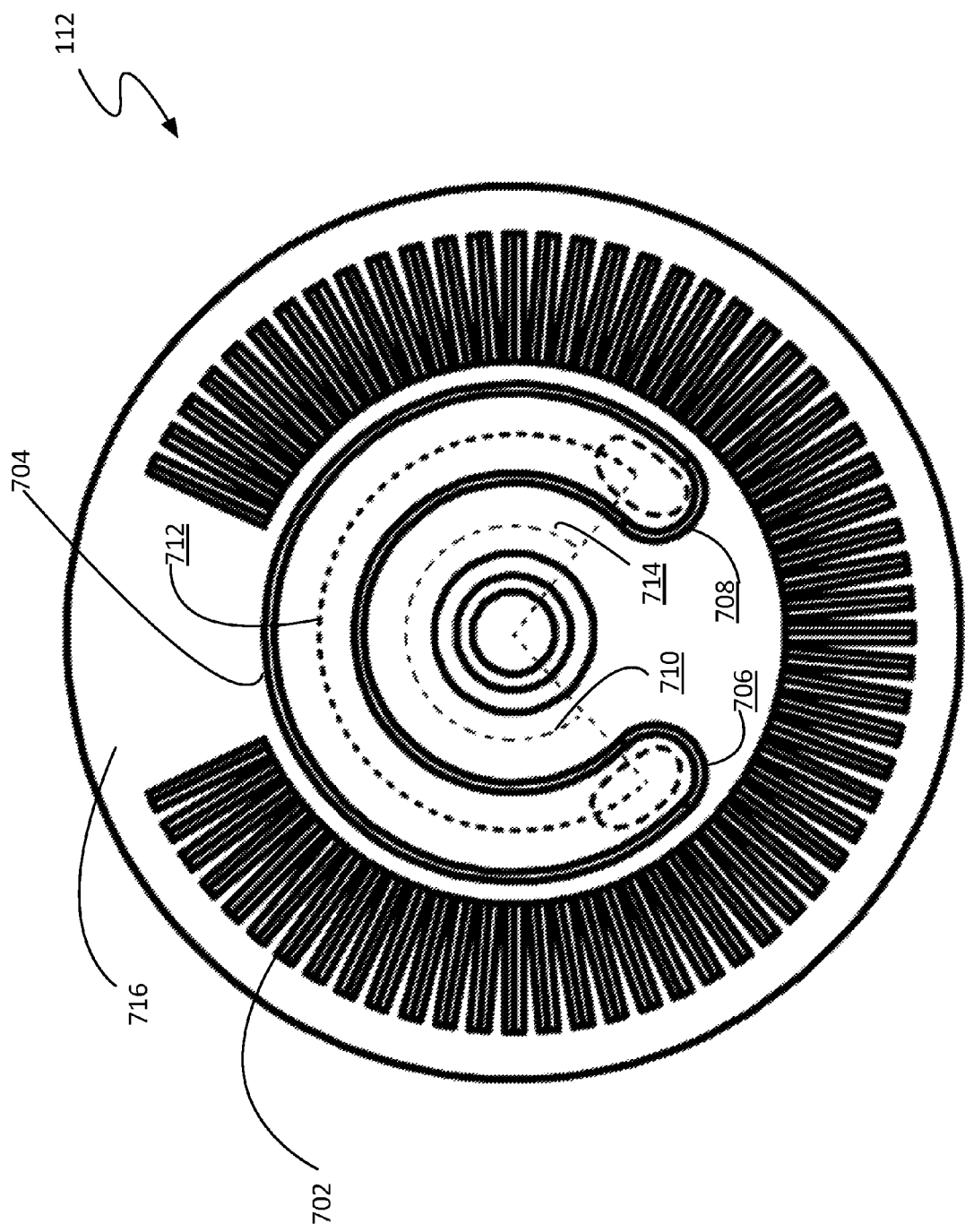
FIG. 7B is a bottom view of an accessory adapter.
Figure 7C:
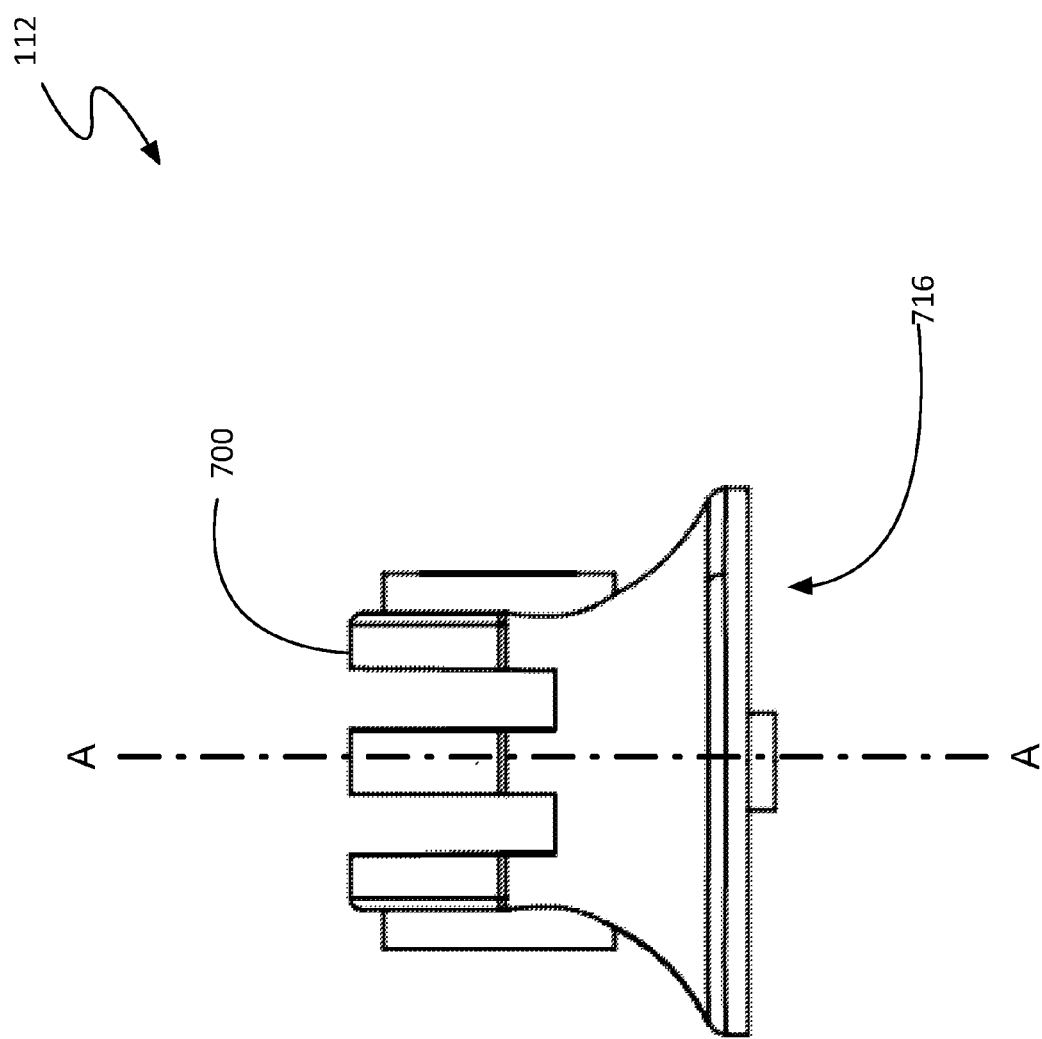
FIG. 7C is a side view of an accessory adapter.

FIG. 7A is a perspective view of an accessory adapter 112, and FIG. 7C is a side view of an accessory adapter 112. As shown, the top of the accessory adapter 112 comprises three ring prongs 700. According to various embodiments, the ring prongs 700 may interface with an accessory 200 having a prong mount, which comprises two similar ring prongs that fit between the three ring prongs 700 of the accessory adapter 112. When the rings are all aligned, a locking cylinder is inserted through all five rings, coupling the accessory 200 to the accessory adapter 112.

In other embodiments, an accessory adapter 112 may comprise other interfaces to which an accessory 200 may be attached. Exemplary interfaces include, but are not limited to, a threaded post (e.g. a ¼"-20 male threaded post, etc.), a clamp, a suction cup, a magnet, and/or any other interface capable of attaching to an accessory 200, or a case holding an accessory 200.

In some embodiments, an accessory adapter 112 may be rotatably coupled to a base connector 300. It may be advantageous to limit the rotation of the accessory adapter 112 with respect to the base connector 300 to a particular range. Allowing the accessory adapter to freely rotate 360 degrees may result in eventual mechanical failure. For example, if a user always rotates the accessory adapter 112 in the same direction, a threaded fastener such as the fastener 306 of FIG. 3 may become loose or stripped over time.

Figure 7D:
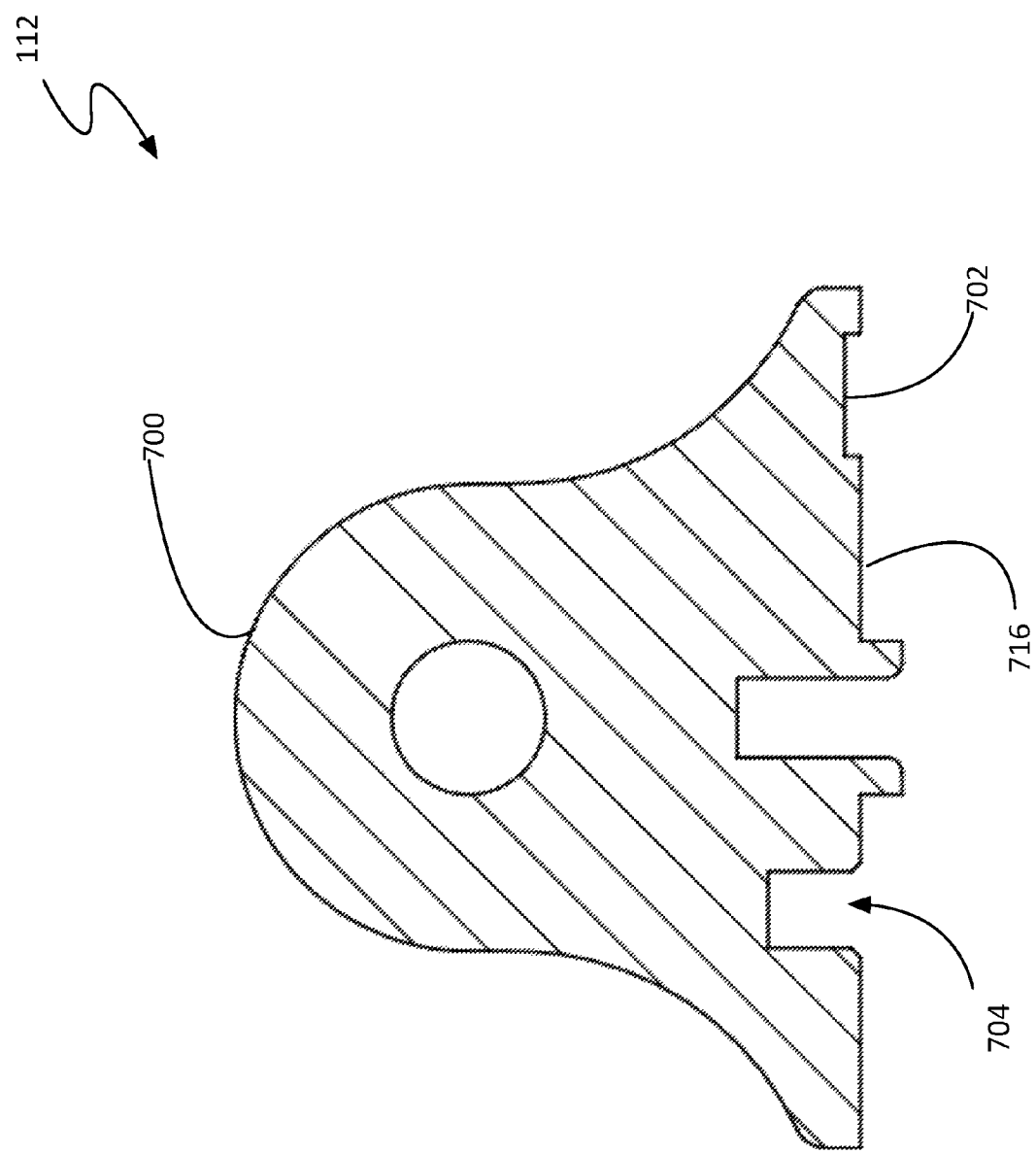
FIG. 7D is a cross section view of an accessory adapter along line A-A of FIG. 7C.

Accordingly, in some embodiments, the rotation of an accessory adapter 112 with respect to a base connector 300 may be limited to a range 714. FIG. 7B is a bottom view of a non-limiting embodiment of an accessory adapter 112, and FIG. 7D is a cross section view of a non-limiting embodiment of an accessory adapter 112 along the line A-A of FIG. 7C. As shown, a bottom surface 716 of the accessory adapter 112 comprises an annular channel 704 having a first end 706 and a second end 708. In some embodiments, the annular channel 704 may be an arc that is centered on the axis of rotation 308.

When an accessory adapter 112 is coupled with a base connector 300, the stop 600 located on the top surface 606 of the base connector 300 (see FIGS. 6A, 6B, and 6D) is mated with, or seated within the annular channel 704. As the accessory adapter 112 rotates with respect to the base connector 112, the stop 600 moves along the annular channel. Thus, the range of rotation 716 of an accessory receiver 106 is limited to the size of the annular channel 704. In other words, the range of rotation 716 is limited to an angle 710 subtended by a segment 712 of the annular channel 704 accessible to the stop 600 between the first end 706 and the second end 708, as measured from the axis of rotation 308, according to various embodiments. In other embodiments, the rotation may be limited to a range through other methods, including but not limited to the use of an asymmetrical fastener to rotatably couple an accessory adapter 112 with a base connector 300 such that it runs into the structure of the adapter or connector when rotated beyond a particular angle.

In many cases, an accessory mount 100 may be utilized in circumstances in which it may be exposed to jarring forces. The ability to rotate an attached accessory 200 with respect to the base 102 to obtain an ideal orientation quickly becomes a problem if unintentional rotations occur due to these jarring forces. In some embodiments, rotation of an accessory adapter 112 with respect to a base connector 300 may be resisted through the structure of the components. See, for example, FIGS. 7B and 7D in conjunction with FIGS. 6B and 6D. In some embodiments, a bottom surface 716 of an accessory adapter 112 may comprise at least one tooth 702, or in some cases a plurality of teeth 702. Likewise, a top surface 606 of a base connector 300 may also comprise at least one tooth 602. When the accessory adapter 112 is coupled with the base connector 300, the teeth on the two surfaces engage with each other. While the teeth are engaged, rotation of the accessory adapter 112 with respect to the base connector 300 is resisted. When the teeth are disengaged, rotation is no longer resisted.

In some embodiments, the teeth of the accessory receiver 106 may be composed of an elastic material which may deform upon application of sufficient force, allowing the teeth to disengage and rotation to commence. In other embodiments, the accessory adapter 112 may be coupled to the base connector 300 with a spring-loaded fastener, such that a user may pull the accessory adapter 112 upward to disengage the teeth (while keeping the stop 600 seated within the annular channel 704) and rotate the accessory adapter. When the desired orientation is achieved, the user releases the accessory adapter, and the spring-loaded fastener causes the teeth to re-engage. In other embodiments, rotational resistance may be provided by increasing the friction between the two pieces (e.g. use of materials with a high static coefficient of friction, use of patterned surfaces, etc.).

Figure 8:
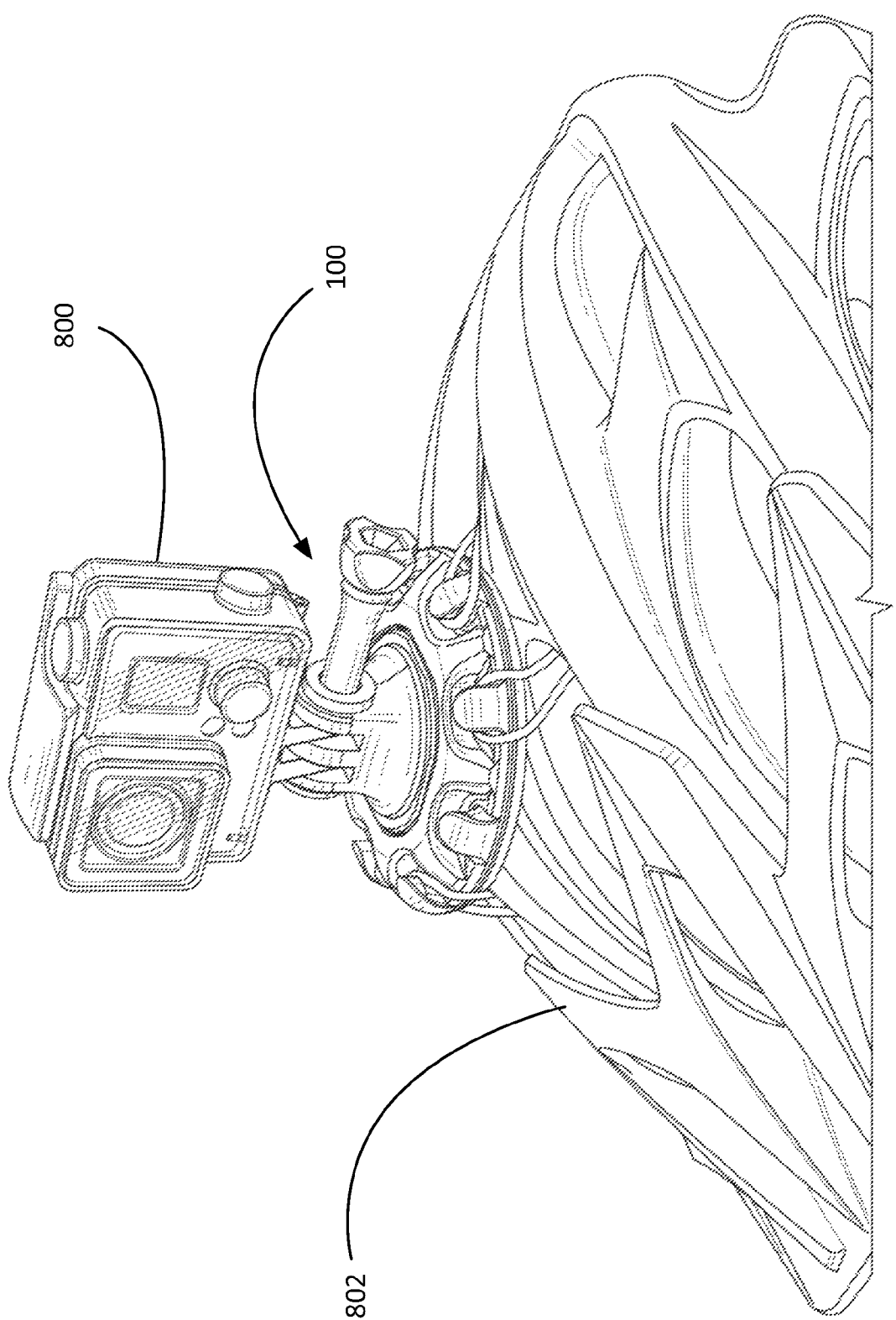
FIG. 8 is a perspective view of an accessory mount coupling a camera to a helmet.
Figure 9:
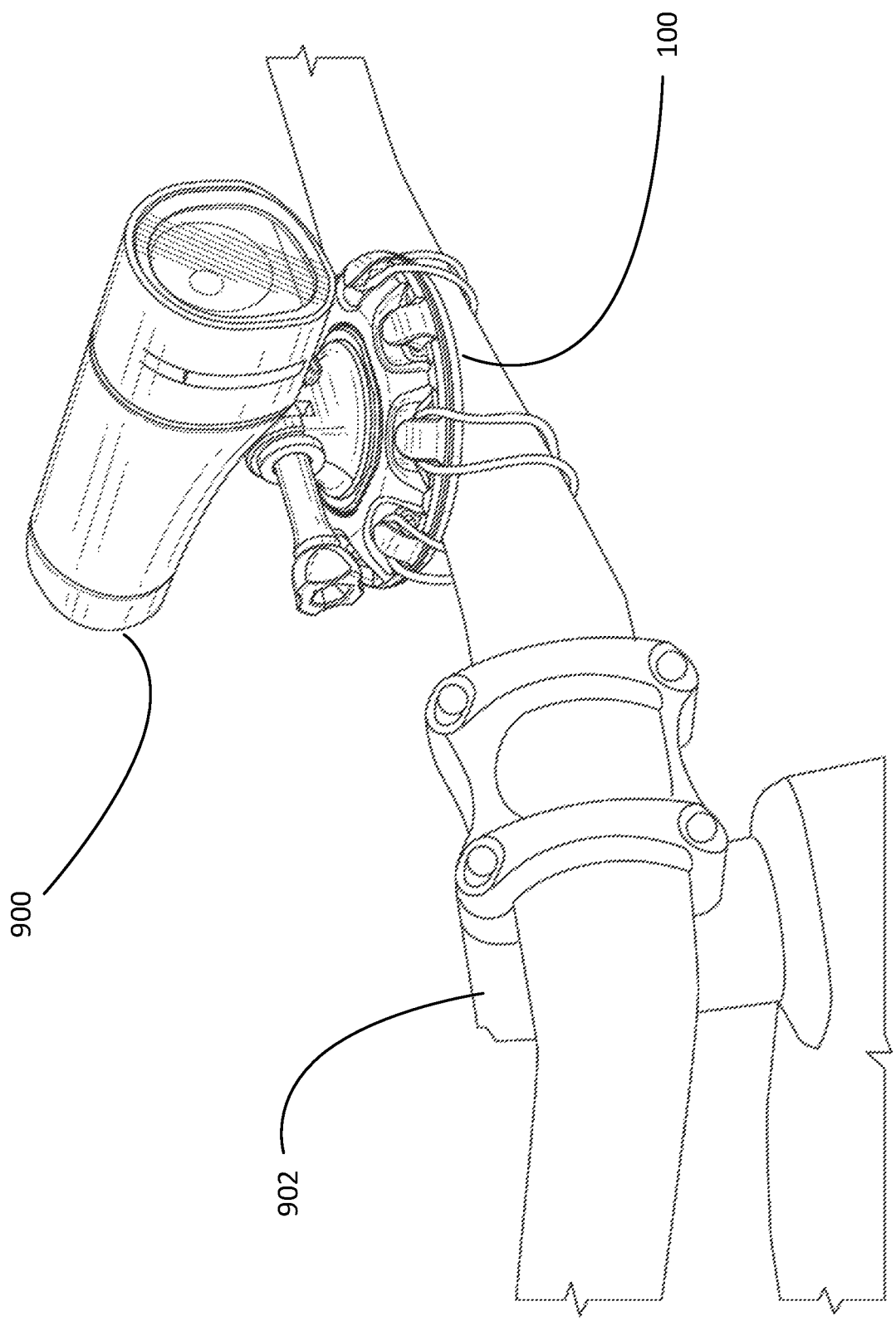
FIG. 9 is a perspective view of an accessory mount coupling a light to a handlebar.

In use, an accessory mount 100 may allow a user to easily and securely attach an accessory 200 to a variety of anchors 202. See, for example, FIGS. 8 and 9. FIG. 8 shows a non-limiting embodiment of an accessory mount 100 coupling a camera 800 to a helmet 802. FIG. 9 shows a non-limiting embodiment of an accessory mount 100 coupling a light 900 to the handlebars of a bicycle 902. According to various embodiments, a user may first attach an accessory mount 100 to an anchor 202. For example, in FIG. 8, a user may attach a first end 114 of an elastic binding 108 to a first attachment point 110A, then thread the elastic binding 108 in through one vent of the helmet 802 and out another vent. The second end 116 of the binding 108 is then attached to the second attachment point 110B. The process may be repeated with additional elastic bindings 108 using other attachment points 110. In some cases, a helmet 802 may have recesses or channels on the inside to guide the elastic bindings 108, and allow them to sit flush with the inside of the helmet 802, according to some embodiments.

After the accessory mount 100 is secured to the helmet 802, the user may then couple the camera 800 to the accessory mount 100 by attaching it to the accessory adapter 112 (specifically, the three ring prongs 700 of the accessory adapter 112). The user may then adjust the orientation of the camera 800. An accessory mount 100 may be used to couple a light 900 to a bicycle 902 in a similar manner, as shown in FIG. 9. Advantageously, the same accessory mount 100 used to couple a camera 800 with a helmet 802 in FIG. 8 could also be used to couple a light 900 with a bicycle 902 in FIG. 9, according to various embodiments.

Where the above examples, embodiments and implementations reference examples, it should be understood by those of ordinary skill in the art that other accessories and binding devices and examples could be intermixed or substituted with those provided. In places where the description above refers to particular embodiments of accessory mounts, it should be readily apparent that a number of modifications may be made without departing from the spirit thereof and that these embodiments and implementations may be applied to other to mounting technologies as well. Accordingly, the disclosed subject matter is intended to embrace all such alterations, modifications and variations that fall within the spirit and scope of the disclosure and the knowledge of one of ordinary skill in the art.

What is claimed is:

1. An accessory mount, comprising:
a base comprising a plurality of attachment points symmetrically distributed at different locations around all sides of a perimeter of the base, the base comprising at least one opening extending through the base;
an accessory receiver comprising an accessory adapter at a first end and a base connector at a second end opposite the first end, the accessory receiver configured to rotatably couple an accessory to the base;
a foot coupled to the base opposite the accessory receiver, the foot comprising a non-slip surface on a first side and a plurality of projections extending toward the base on a second side, opposite the first side, the plurality of projections mating with a corresponding plurality of recesses in a bottom surface of the base; and
at least two elastic bindings, each having a first end and a second end, opposite the first end, the first end configured to releasably and directly attach to a first attachment point of the plurality of attachment points, the second end configured to releasably and directly attach to a second attachment point of the plurality of attachment points opposite the first attachment point.

2. The accessory mount of claim 1:
wherein the accessory adapter further comprises an annular channel in a bottom surface, the annular channel comprising a first end and a second end;
wherein the base connector comprises a stop extending from a top surface of the base connector, the accessory adapter and the base connector rotatably coupled to each other through the stop mating with the annular channel, the stop moving along the annular channel as the accessory adapter rotates with respect to the base connector about an axis;
wherein a range of rotation of the accessory adapter with respect to the base is limited to an angle, measured from the axis, subtended by a segment of the annular channel accessible to the stop between the first end and the second end; and
wherein the range of rotation is between 240 and 300 degrees.

3. The accessory mount of claim 1, wherein the accessory adapter comprises at least one tooth on its bottom surface, the at least one tooth engaged with another at least one tooth on the top surface of the base connector, such that rotation of the accessory adapter with respect to the base is resisted.

4. The accessory mount of claim 1, wherein the accessory adapter rotatably mounts to the base connector.

5. The accessory mount of claim 1, wherein the base is stiffer than the foot.

6. The accessory mount of claim 1, wherein the accessory receiver comprises three ring prongs extending from the first end of the accessory receiver and away from the second end of the accessory receiver.

7. The accessory mount of claim 1, wherein the plurality of attachment points comprises at least five attachment points.

8. The accessory mount of claim 1:
wherein the base and the foot are circular;
wherein the plurality of attachment points comprises eight attachment points;
wherein the accessory adapter is rotatably coupled to the base connector; and
wherein the base connector is coupled to the base, but does not rotate with respect to the base.

9. An accessory mount, comprising:
a base comprising a plurality of attachment points symmetrically distributed at different locations around a majority of a perimeter of the base, the base comprising at least one opening extending through the base;
an accessory receiver comprising an accessory adapter at a first end and a base connector at a second end opposite the first end, the accessory receiver configured to rotatably couple an accessory to the base;
a foot coupled to the base opposite the accessory receiver, the foot comprising a non-slip surface on a first side and a plurality of projections extending toward the base on a second side, opposite the first side, the plurality of projections mating with a corresponding plurality of recesses in a bottom surface of the base;
at least two elastic bindings, each having a first end and a second end, opposite the first end, the first end configured to releasably and directly attach to a first attachment point of the plurality of attachment points, the second end configured to releasably and directly attach to a second attachment point of the plurality of attachment points opposite the first attachment point.

10. The accessory mount of claim 9:
wherein the accessory adapter further comprises an annular channel in a bottom surface, the annular channel comprising a first end and a second end;
wherein the base connector comprises a stop extending from a top surface of the base connector, the accessory adapter and the base connector rotatably coupled to each other through the stop mating with the annular channel, the stop moving along the annular channel as the accessory adapter rotates with respect to the base connector about an axis; and
wherein a range of rotation of the accessory adapter with respect to the base is limited to an angle, measured from the axis, subtended by a segment of the annular channel accessible to the stop between the first end and the second end.

11. The accessory mount of claim 9, wherein the accessory adapter rotatably mounts to the base connector.

12. The accessory mount of claim 9, wherein the base is stiffer than the foot.

13. The accessory mount of claim 9, wherein the accessory receiver comprises three ring prongs extending from the first end of the accessory receiver and away from the second end of the accessory receiver.

14. The accessory mount of claim 9, wherein the accessory is at least one of a camera, a light, a phone, a GPS receiver, and a portable electronic device.

15. An accessory mount, comprising:
a base which is circular, the base comprising at least five attachment points distributed at different locations around the base, the base comprising at least one opening extending through a center of the base;
an accessory receiver comprising an accessory adapter at a first end and a base connector at a second end opposite the first end, the accessory receiver configured to rotatably couple an accessory to the base; and a foot coupled to the base opposite the accessory receiver, the foot comprising a non-slip surface on a first side and a plurality of projections extending toward the base on a second side, opposite the first side, the plurality of projections mating with a corresponding plurality of recesses in a bottom surface of the base.

16. The accessory mount of claim 15, further comprising:
at least two elastic bindings, each having a first end and a second end, opposite the first end, the first end configured to releasably and directly attach to a first attachment point of the plurality of attachment points, the second end configured to releasably and directly attach to a second attachment point of the plurality of attachment points opposite the first attachment point.

17. The accessory mount of claim 15:
wherein the accessory adapter further comprises an annular channel in a bottom surface, the annular channel comprising a first end and a second end;
wherein the base connector comprises a stop extending from a top surface of the base connector, the accessory adapter and the base connector rotatably coupled to each other through the stop mating with the annular channel, the stop moving along the annular channel as the accessory adapter rotates with respect to the base connector about an axis; and
wherein a range of rotation of the accessory adapter with respect to the base is limited to an angle, measured from the axis, subtended by a segment of the annular channel accessible to the stop between the first end and the second end.

18. The accessory mount of claim 15, wherein the accessory adapter rotatably mounts to the base connector.

19. The accessory mount of claim 15, wherein the base is stiffer than the foot.

20. The accessory mount of claim 15:
wherein the at least one opening extending through the center of the base comprises an internal lip which narrows the at least one opening;
wherein a bottom surface of the base connector comprises at least two tabs;
wherein the base connector is non-circular;
wherein the base further comprises a non-circular recess centered on the at least one opening, the non-circular recess matching a shape of the non-circular base connector; and
wherein the base connector is seated in the non-circular recess of the base and is releasably coupled to the base by the at least two tabs expanding within the at least one opening after passing the internal lip.

* * * * *